(12) United States Patent
Lee et al.

(10) Patent No.: US 10,419,174 B2
(45) Date of Patent: Sep. 17, 2019

(54) METHOD FOR CONFIGURING AN INTERFERENCE MEASUREMENT RESOURCE IN A WIRELESS COMMUNICATION SYSTEM, AND APPARATUS FOR THEREOF

(71) Applicant: LG ELECTRONICS INC., Seoul (KR)

(72) Inventors: Seungmin Lee, Seoul (KR); Hanbyul Seo, Seoul (KR); Kijun Kim, Seoul (KR); Inkwon Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 14/671,581

(22) Filed: Mar. 27, 2015

(65) Prior Publication Data

US 2015/0280878 A1 Oct. 1, 2015

Related U.S. Application Data

(60) Provisional application No. 61/972,407, filed on Mar. 30, 2014, provisional application No. 61/982,831, filed on Apr. 22, 2014.

(51) Int. Cl.
*H04L 5/00* (2006.01)
(52) U.S. Cl.
CPC .......... *H04L 5/0048* (2013.01); *H04L 5/0035* (2013.01); *H04L 5/0073* (2013.01)
(58) Field of Classification Search
CPC .... H04L 5/0035; H04L 5/0048; H04L 5/0073
See application file for complete search history.

(56) References Cited

U.S. PATENT DOCUMENTS

2012/0287875 A1* 11/2012 Kim ..................... H04W 76/046
370/329
2013/0258965 A1* 10/2013 Geirhofer ........... H04W 72/048
370/329

(Continued)

FOREIGN PATENT DOCUMENTS

| CN | 102547872 | 7/2012 |
| EP | 2547155 | 1/2013 |
| WO | 2013048030 | 4/2013 |

OTHER PUBLICATIONS

PCT International Application No. PCT/KR2015/003099, Written Opinion of the International Searching Authority dated Jun. 25, 2015, 16 pages.

(Continued)

*Primary Examiner* — Andrew Lai
*Assistant Examiner* — M Mostazir Rahman
(74) *Attorney, Agent, or Firm* — Lee Hong Degerman Kang Waimey

(57) ABSTRACT

The present invention relates to a method of transmitting CSI-RS (channel state information-reference signal) configuration, which is transmitted by a base station in a wireless communication system, and an apparatus therefor. Specifically, the method includes the steps of composing an information element configuring a first CSI (channel state information) subframe set and a second CSI subframe set and transmitting the CSI-RS configuration including at least one or more ZP-CSI-RS configurations (zero power CSI-RS configuration). The CSI-RS configuration includes a first ZP-CSI-RS configuration for a first user equipment to which the information element is not set and a second user equipment to which the information element is set and a second ZP-CSI-RS configuration for the second user equipment only.

6 Claims, 8 Drawing Sheets

(56) References Cited

U.S. PATENT DOCUMENTS

| | | | | |
|---|---|---|---|---|
| 2013/0301450 A1* | 11/2013 | Geirhofer | ............... | H04B 7/024 370/252 |
| 2014/0073336 A1 | 3/2014 | Kang | | |
| 2014/0233407 A1* | 8/2014 | Pourahmadi | .......... | H04L 5/0007 370/252 |
| 2015/0215093 A1* | 7/2015 | Kim | ...................... | H04L 5/0005 370/329 |

OTHER PUBLICATIONS

CATT "Remaining details on aperiodic CSI feedback for transmission mode 10," 3GPP TSG RAN WG1 Meeting #76bis, R1-141175, Mar. 2014, 6 pages.

ZTE, "Remaining details of CSI feedback for TDD eIMTA," 3GPP TSG RAN WG1 Meeting #76bis, R1-141420, Mar. 2014, 9 pages.

Samsung, "Subframe Pattern signaling aspects in eIMTA," 3GPP TSG RAN WG2 Meeting #85bis, R2-141640, Mar. 2014, 4 pages.

Huawei, et al., "RRC configuration issues for eIMTA," 3GPP TSG-RAN WG2 Meeting #85bis, R2-141598, Mar. 2014, 6 pages.

PCT International Application No. PCT/KR2015/003099, Written Opinion of the International Searching Authority dated Jun. 25, 2015, 9 pages.

European Patent Office Application Serial No. 15774157.0, Search Report dated Sep. 22, 2017, 11 pages.

Alcatel-Lucent, "PDSCH rate matching behaviour for ZP CSI-RS resources and IMRs", 3GPP TSG RAN WG1 Meeting #71, R1-124862, Nov. 2012, 8 pages.

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.1.0, XP050770002, Mar. 2014, 186 pages.

Texas Instruments, "Views on CSI measurement for LTE TDD eIMTA", 3GPP TSG RAN WG1 Meeting #76, R1-140530, Feb. 2014, 6 pages.

Broadcom, "CSI measurement and reporting in TDD eIMTA", 3GPP TSG RAN WG1 Meeting #75, R1-135535, Nov. 2013, 4 pages.

Catt, "CSI feedback in TDD eIMTA", 3GPP TSG RAN WG1 Meeting #74bis, R1-134081, Oct. 2013, 3 pages.

The State Intellectual Property Office of the People's Republic of China Application Serial No. 201580018251.5, Office Action dated Jan. 19, 2018, 13 pages.

* cited by examiner

FIG. 2
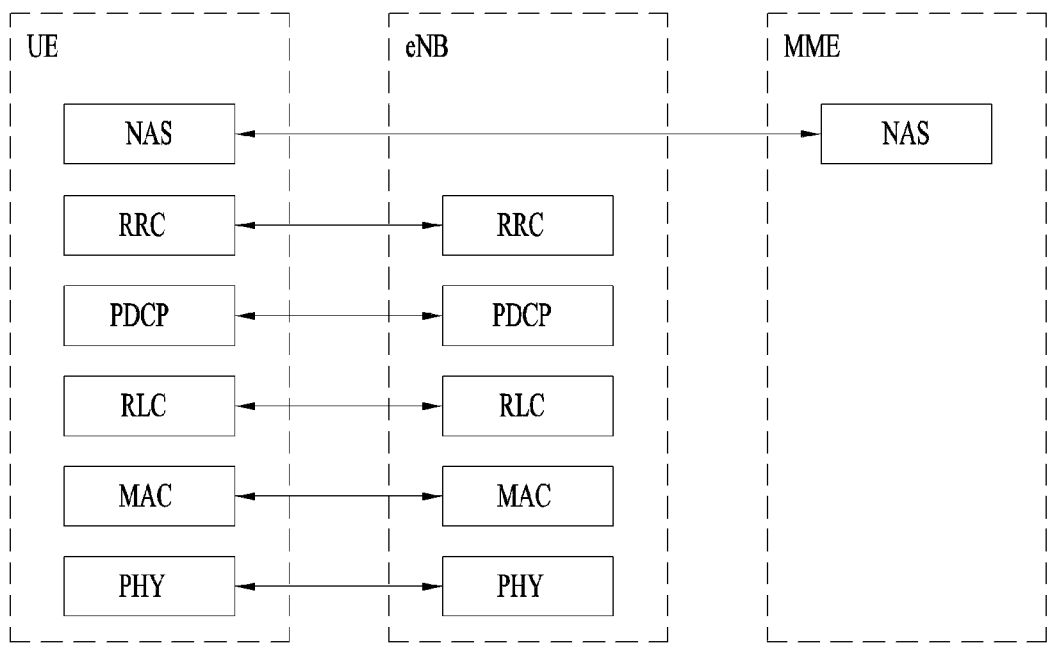
(a) control-plane protocol stack
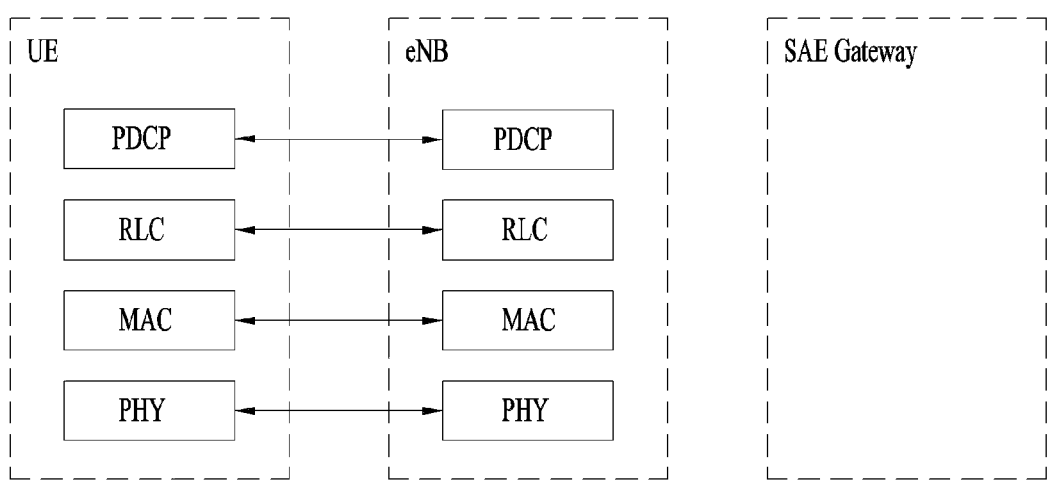
(b) user-plane protocol stack

METHOD FOR CONFIGURING AN INTERFERENCE MEASUREMENT RESOURCE IN A WIRELESS COMMUNICATION SYSTEM, AND APPARATUS FOR THEREOF This application claims the benefit of U.S. Provisional Patent Application No. 61/972,407 filed on Mar. 30, 2014, and U.S. Provisional Patent Application No. 61/982,831 filed on Apr. 22, 2014, the contents of which are hereby incorporated by reference herein in its entirety.

BACKGROUND OF THE INVENTION

1. Field of the Invention

The present invention relates to a wireless communication system, and more particularly, to a method of configuring an interference measurement resource in a wireless communication system and an apparatus therefor.

2. Discussion of the Related Art

A 3rd generation partnership project long term evolution (3GPP LTE) (hereinafter, referred to as 'LTE') communication system which is an example of a wireless communication system to which the present invention can be applied will be described in brief FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

SUMMARY OF THE INVENTION

An object of the present invention is to provide a method of configuring an interference measurement resource in a wireless communication system and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting a CSI-RS (channel state information-reference signal) configuration, which is transmitted by a base station in a wireless communication system, includes the steps of composing an information element configuring a first CSI (channel state information) subframe set and a second CSI subframe set and transmitting the CSI-RS configuration including at least one or more ZP-CSI-RS configurations (zero power CSI-RS configurations). In this case, the CSI-RS configuration includes a first ZP-CSI-RS configuration for a first user equipment to which the information element is not set and a second user equipment to which the information element is set and a second ZP-CSI-RS configuration for the second user equipment only.

Preferably, the first user equipment may correspond to a user equipment based on a transmission mode 1 to a transmission mode 9.

The second user equipment may correspond to a user equipment based on the transmission mode 1 to the transmission mode 9 performing CSI measurement based on the first CSI subframe set and the second CSI subframe set according to the information element.

Preferably, a zeroTxPowerResourceConfigList parameter and a zeroTxPowerSubframeConfig parameter can be independently configured for the first ZP-CSI-RS configuration and the second ZP-CSI-RS configuration, respectively.

Preferably, the method can further include the step of receiving a channel state information report based on the first CSI subframe set and the second CSI subframe set. More preferably, the first CSI subframe set and the second CSI subframe set may correspond to a restricted CSI measurement subframe set.

To further achieve these objects and other advantages and in accordance with the purpose of the invention, as embodied and broadly described herein, according to a different embodiment, a method of reporting channel state information, which is reported by a user equipment in a wireless communication system, includes the steps of receiving an information element configuring a first CSI (channel state information) subframe set and a second CSI subframe set and receiving CSI-RS configuration including at least one or more ZP-CSI-RS configurations (zero power CSI-RS configurations). In this case, the CSI-RS configuration includes a first ZP-CSI-RS configuration and a second ZP-CSI-RS configuration which is applied when the information element is configured.

Preferably, the first ZP-CSI-RS configuration is defined for a user equipment based on a transmission mode 1 to a transmission mode 9 and the second ZP-CSI-RS configuration is defined for a user equipment based on the transmission mode 1 to the transmission mode 9 performing CSI measurement based on the first CSI subframe set and the second CSI subframe set according to the information element.

To further achieve these objects and other advantages and in accordance with the purpose of the invention, as embodied and broadly described herein, according to a further different embodiment, a base station transmitting a CSI-RS (channel state information-reference signal) configuration in a wireless communication system includes an RF (radio frequency) unit and a processor, the processor configured to compose an information element configuring a first CSI (channel state information) subframe set and a second CSI subframe set, the processor configured to transmit the CSI-RS configuration including at least one or more ZP-CSI-RS configurations (zero power CSI-RS configurations). In this case, the CSI-RS configuration includes a first ZP-CSI-RS configuration for a first user equipment to which the information element is not set and a second user equipment to which the information element is set and a second ZP-CSI-RS configuration for the second user equipment only.

To further achieve these objects and other advantages and in accordance with the purpose of the invention, as embodied and broadly described herein, according to a further different embodiment, a user equipment reporting channel state information in a wireless communication system includes an RF (radio frequency) unit and a processor, the processor configured to receive an information element configuring a first CSI (channel state information) subframe set and a second CSI subframe set, the processor configured to receive CSI-RS configuration including at least one or more ZP-CSI-RS configurations (zero power CSI-RS configurations). In this case, the CSI-RS configuration includes a first ZP-CSI-RS configuration and a second ZP-CSI-RS configuration which is applied when the information element is configured.

According to the present invention, it is able to efficiently configure an interference measurement resource when a radio resource is dynamically changed in a wireless communication system according to a system load.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram for structures of control and user planes of radio interface protocol between a 3GPP radio access network standard-based user equipment and E-UTRAN;

DETAILED DESCRIPTION OF THE INVENTION

Figure 1:
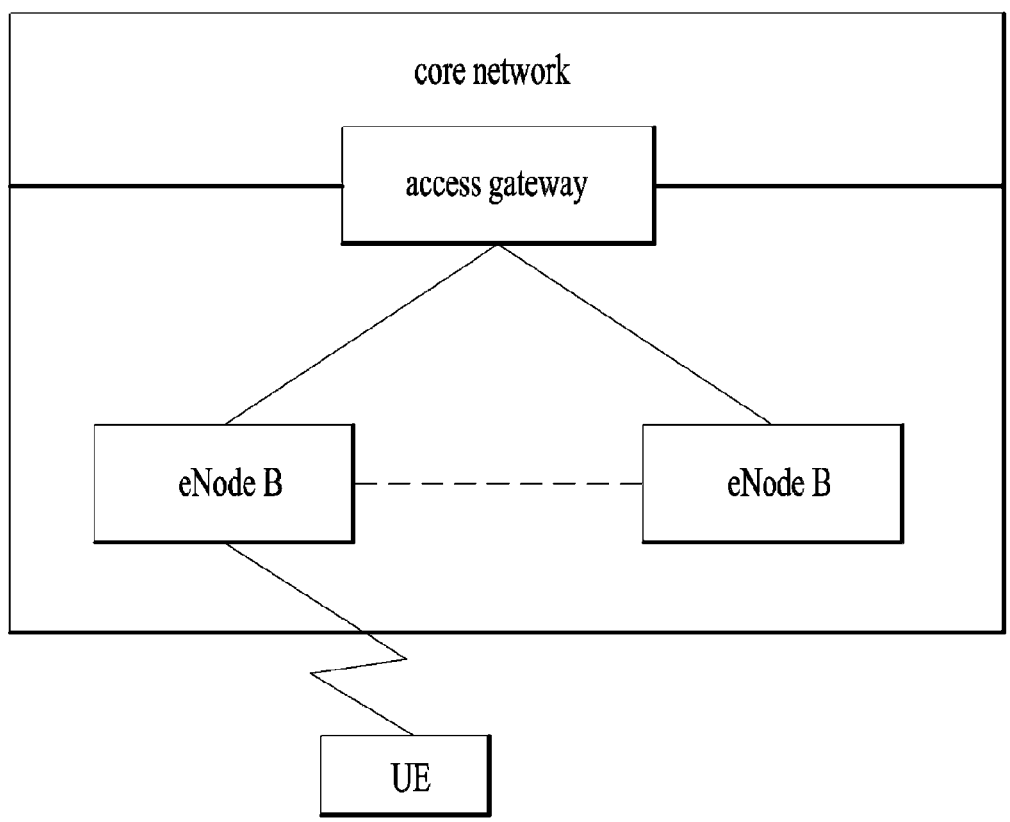
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
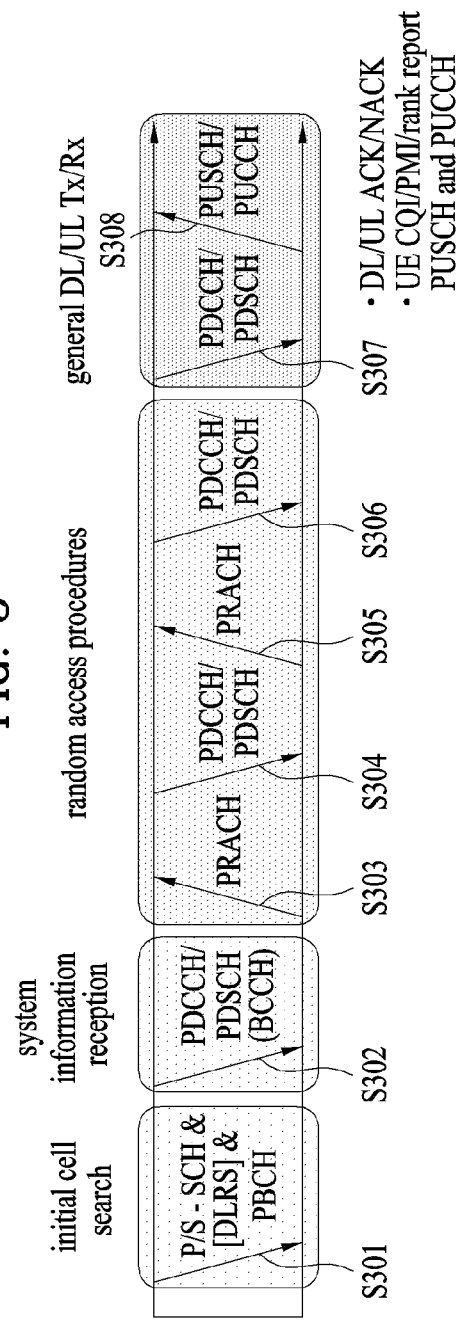
FIG. 3 is a diagram for explaining physical channels used for 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
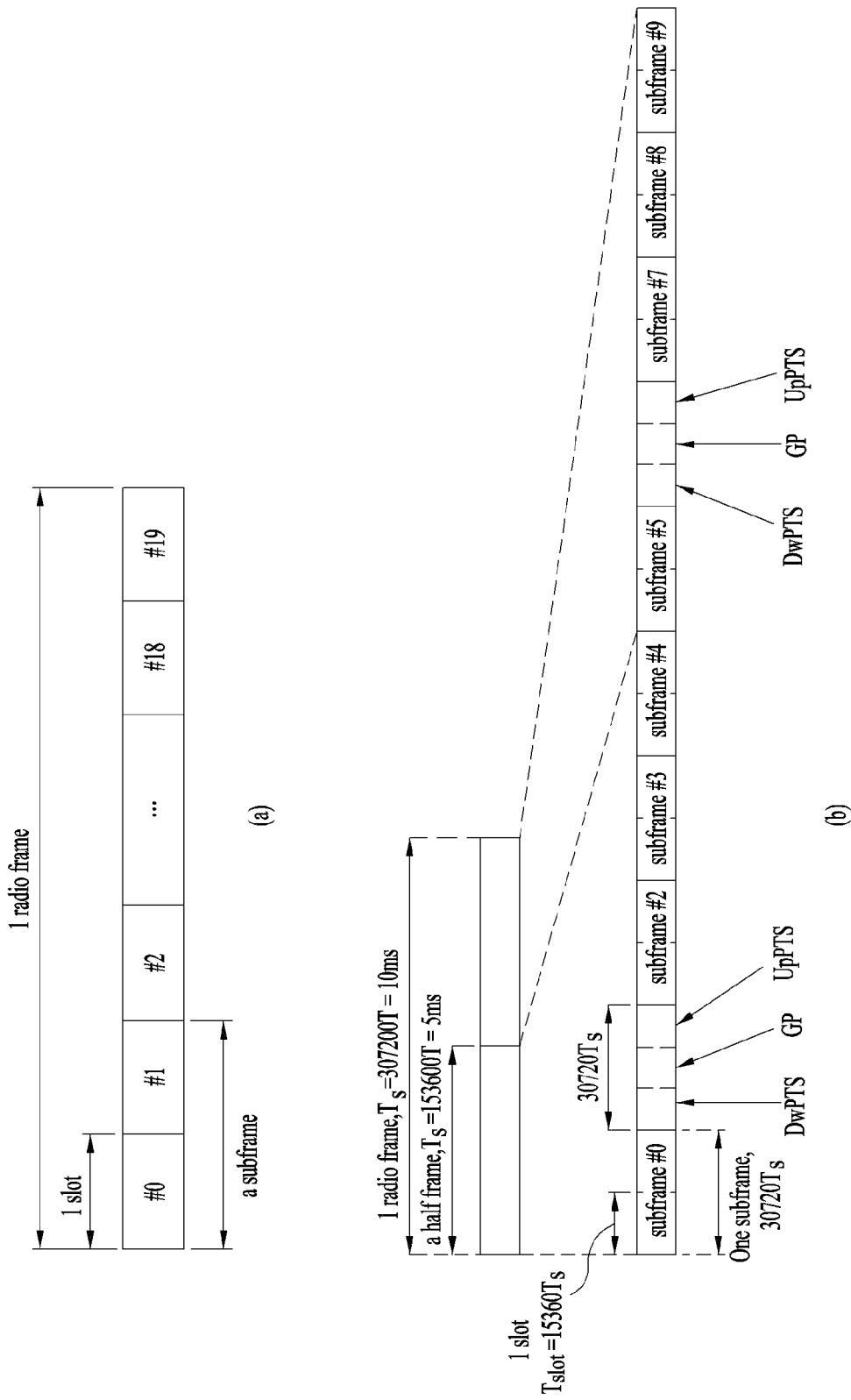
FIG. 4 is a diagram for a structure of a radio frame in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
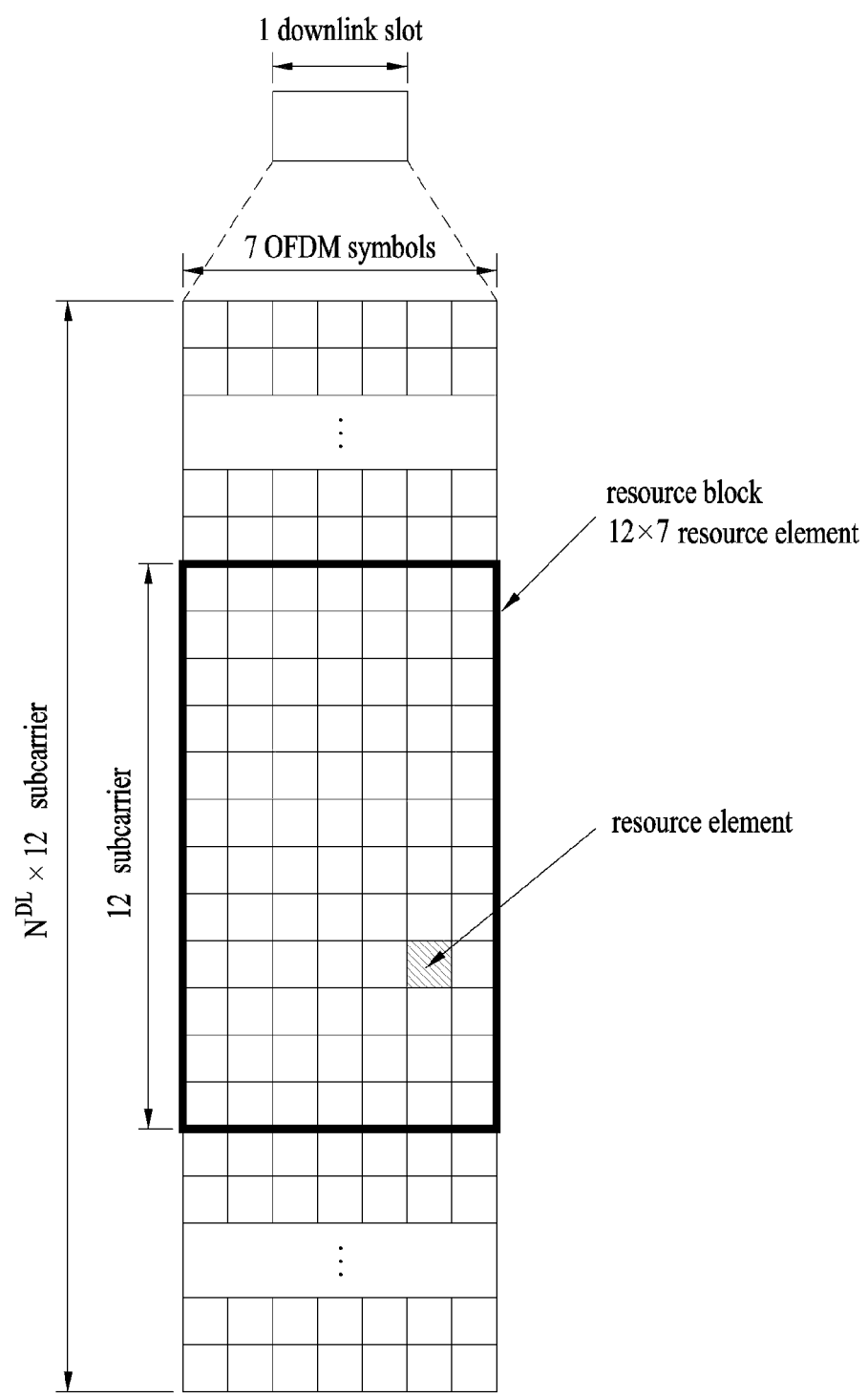
FIG. 5 is a diagram for one example of a resource grid for a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
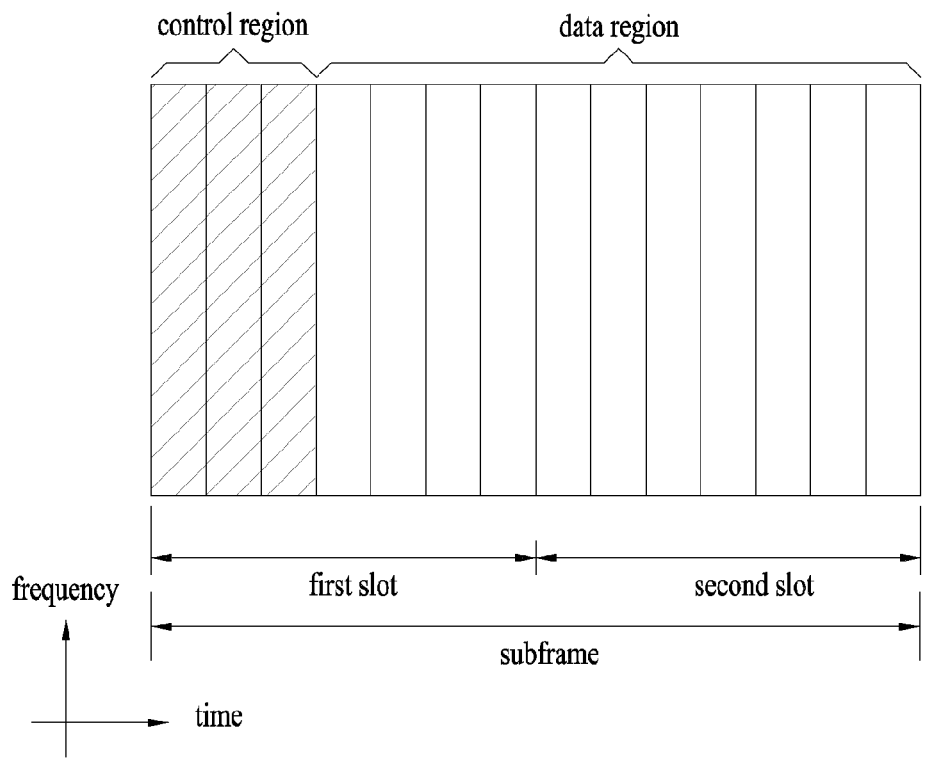
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
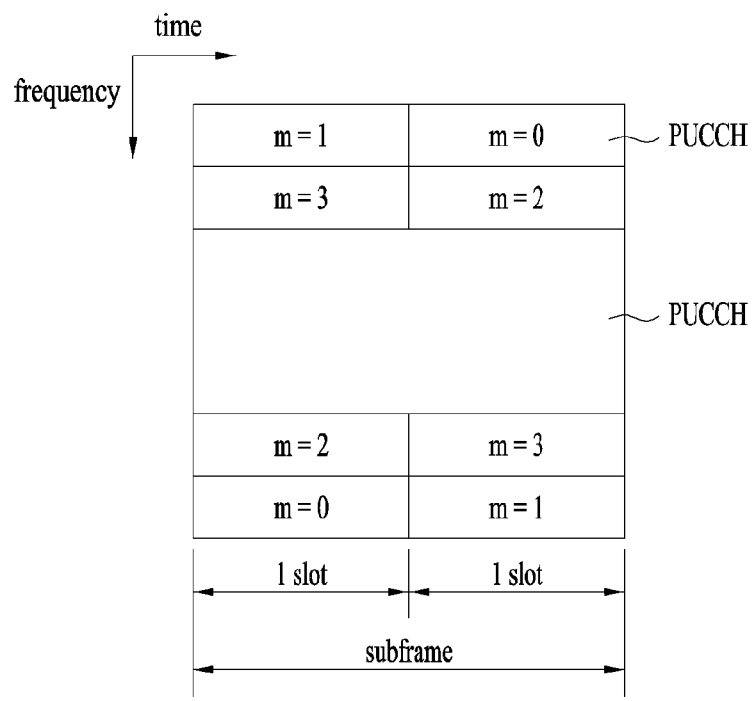
FIG. 7 is a diagram for an example of a structure of an uplink subframe in LTE.

FIG. 7 is a diagram illustrating a structure of an uplink subframe used in an LTE system.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.
  SR (Scheduling Request): is information used to request uplink UL-SCH resource. The SR is transmitted using an on-off keying (OOK) system.
  HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.

CSI (Channel State Information): is feedback information on a downlink channel. The CSI includes CQI (Channel Quality Indicator), and MIMO (Multiple Input Multiple Output) related feedback information includes a rank indicator (RI), a precoding matrix indicator (PMI), a precoding type indicator (PTI), etc. 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH.

In the following, CoMP (Cooperative Multipoint Transmission/Reception) is explained.

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by 2 or more base stations, access points or cells to cooperatively communicate with a user equipment to smoothly perform communication between the specific user equipment and the base stations, the access points or the cells. Throughout the present invention, a base station, an access point or a cell can be used as an identical meaning.

In general, inter-cell interference may decrease performance of a user equipment situated at a cell boundary and throughput of an average sector in a multi-cell environment where a frequency reuse index corresponds to 1. In order to reduce the inter-cell interference, a legacy LTE system adopted a simple and passive method such as a fractional frequency reuse (FFR) via UE-specific power control for a user equipment situated at a cell boundary to have a reasonable performance efficiency in an interference-limited environment. Yet, instead of reducing the use of frequency resource per each cell, it may be more preferable to reduce the ICI or reuse the ICI with a signal desired by a user equipment. In order to achieve the aforementioned purpose, the CoMP transmission scheme can be applied.

Figure 8:
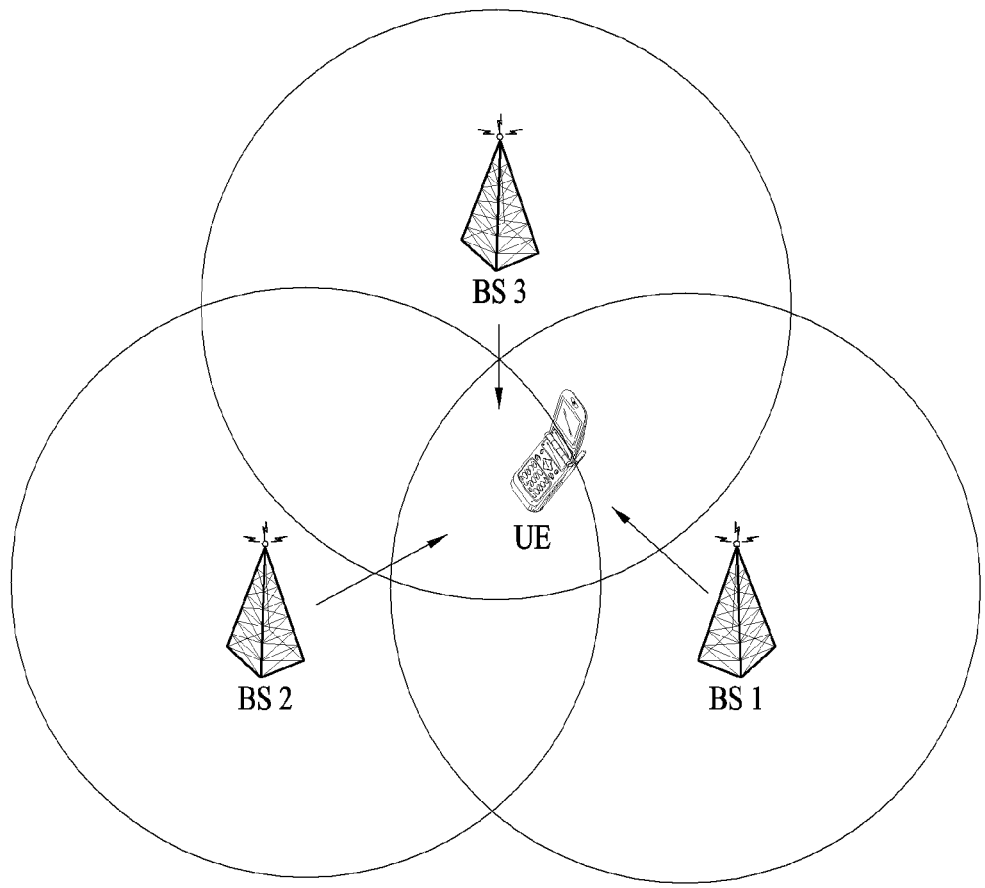
FIG. 8 is a diagram for an example of performing CoMP.

FIG. 8 is a diagram for an example of performing CoMP. Referring to FIG. 8, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other. The CoMP can be mainly classified into two types according to whether data is transmitted from each of a plurality of the base stations performing the CoMP:

Joint processing (CoMP Joint Processing (CoMP-JP))
Cooperative scheduling/beamforming (CoMP-CS/CB)

According to the CoMP-JT, data are simultaneously transmitted to a user equipment from each of a plurality of the base stations performing the CoMP and the user equipment increases reception capability by combining signals transmitted from each of a plurality of the base stations with each other. In particular, according to the CoMP-JP scheme, data can be used in each point (base station) of CoMP cooperation units. The CoMP cooperation units indicate a set of base stations used for a cooperative transmission scheme. The JP scheme can be classified into a joint transmission scheme and a dynamic cell selection scheme.

The joint transmission scheme means a scheme that PDSCHs are simultaneously transmitted from a plurality of transmission points (a part or a whole of the CoMP cooperation units). In particular, data transmitted to single user equipment can be simultaneously transmitted from a plurality of the transmission points. According to the joint transmission scheme, quality of a received signal can be coherently or non-coherently enhanced and interference interfering a different user equipment may be actively eliminated as well.

The dynamic cell selection scheme means a scheme that PDSCH is transmitted from a single transmission point (of the CoMP cooperation units) at a time. In particular, data transmitted to single user equipment on a specific time is transmitted from a single point and different points of the CoMP cooperation units do not transmit data to the user equipment on the specific time. A point, which transmits data to the user equipment, can be dynamically selected.

On the contrary, in case of the CoMP-CS, data is transmitted to single user equipment on a random moment via a base station and scheduling or beamforming is performed to minimize interference from a different base station. In particular, according to the CoMP-CS/CB scheme, the CoMP cooperation units can cooperatively perform beamforming for the data transmission transmitted to the single user equipment. In this case, although the data is transmitted from a serving cell, user scheduling/beamforming can be determined by coordination of cells of the CoMP cooperation units.

Meanwhile, in case of UL, coordinated multi-point reception means to receive a signal transmitted by coordination of a plurality of points, which are geographically away from each other. A CoMP scheme applicable to a case of UL can be classified into Joint Reception (JR) and a coordinated scheduling/beamforming (CS/CB).

The JR scheme means that a signal transmitted via PUSCH is received by a plurality of reception points. The CS/CB scheme means that PUSCH is received by a single point and user scheduling/beamforming is determined by coordination of cells of the CoMP cooperation units.

In the following, inter-cell interference between a plurality of cells is explained.

If a part of coverages of two base stations is overlapped with each other like a case that two base stations (e.g., a base station #1 and a base station #2) are arranged in a manner of being adjacent to each other, a user equipment served by one base station may be severely interfered by a strong downlink signal of another base station. As mentioned in the foregoing description, if inter-cell interference occurs, the inter-cell interference can be reduced by using an inter-cell cooperative signaling scheme between two base stations. In various embodiments of the present invention described in the following, assume that a signal is smoothly transmitted and received between two interfering/interfered base stations. For instance, assume a case that transmission and reception of a cooperative signal is very reliable between base stations in a manner that there exists a wired/wireless link (e.g., backhaul link or Un interface) including a good transmission condition such as a transmission bandwidth, time delay or the like between two base stations. And, it may assume a case that time synchronization between two base stations is matched with each other within an allowable error range (e.g., edges of downlink subframes of two interfering/ interfered base stations are aligned) or a case that a difference (offset) of a subframe boundary between two base stations is clearly recognized by the two base stations.

Referring back to FIG. 8, the base station #1 (BS #1) corresponds to a macro base station serving a wide area with a high transmit power and the base station #2 (BS #2) corresponds to a micro base station (e.g., a pico base station) serving a small area with a low transmit power. As shown in an example of FIG. 8, if a UE, which is located at a cell boundary area of the base station #2 and served by the base station #2, is severely interfered by the base station #1, it may be difficult to perform efficient communication without an appropriate inter-cell cooperation.

In particular, in case of trying to lessen a service load of the base station #1, which is the macro base station, in a manner of making a large number of terminals to be connected with the base station #2, which is the micro base station of a low transmit power, it is highly probable to have a situation of the aforementioned inter-cell interference. For instance, when a user equipment intends to select a serving base station, the user equipment can calculate and compare reception power of each of downlink signals received from a plurality of base stations with each other in a manner of adding a prescribed adjusting value (a bias value) to reception power from the micro base station and not adding a prescribed adjusting value to reception power from the macro base station. By doing so, the user equipment can select a base station providing highest downlink reception power as the serving base station. Thus, more terminals can be connected to the micro base station. Although strength of a downlink signal actually received from the micro base station is weaker than strength of a signal received from the macro base station, the micro base station can be selected as a serving base station and the terminals connected with the micro base station may experience strong interference from the macro base station. In this case, if a separate inter-cell cooperation is not provided, it may be difficult for terminals located at the boundary of the micro base station to perform a proper operation due to the strong interference from the macro base station.

If there exist inter-cell interference between two base stations, it is necessary to perform appropriate cooperation between the interfering/interfered base stations to perform an efficient operation. A signal enabling the cooperative operation to be performed can be transceived via a link between the two base stations. In this case, if inter-cell interference occurs between a macro base station and a micro base station, the macro base station controls an inter-cell cooperative operation and the micro base station may perform an appropriate operation according to a cooperation signal informed by the macro base station.

The aforementioned inter-cell interference occurrence situation is just an example. It is apparent that embodiments of the present invention can be identically applied to a case (e.g., a case of inter-cell interference occurring between a HeNB of a CSG scheme and a macro base station of an OSG scheme, a case that a micro base station causes interference and a macro base station is interfered by the interference or a case that inter-cell interference exist between micro base stations or macro base stations and the like) different from the aforementioned situation.

Figure 9:
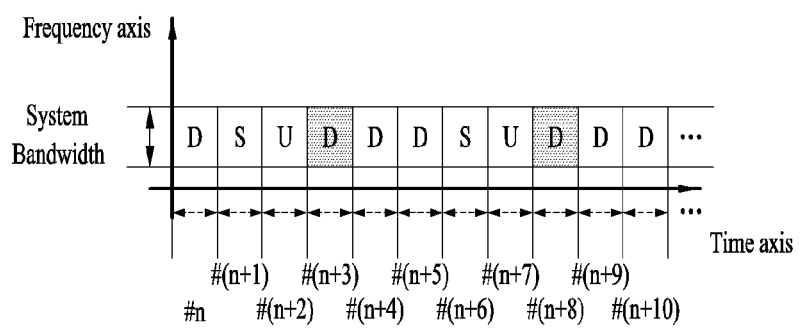
FIG. 9 is a diagram for a case of using a part of legacy uplink resources for the purpose of downlink communication in TDD system environment.

FIG. 9 is a diagram for a case of using a part of legacy uplink resources (i.e., UL SF), which is used by a specific cell according to the increase of downlink load amount, for the purpose of downlink communication in TDD system environment. In FIG. 9, assume uplink-downlink (UL/DL) configuration configured via an SIB as an uplink-downlink #1 (i.e., DSUUDDSUUD) and it is able to know that a legacy UL SF # (n+3) and a UL SF # (n+8) are used for a usage of DL communication in a manner of being changed via a predetermined signal (e.g., a physical/upper layer signal or a system information signal).

In the following, when a usage of a radio resource is dynamically changed according to a load state of a system, a method of efficiently configuring an interference measurement resource (i.e., CSI-IM resource) and/or a zero-power CSI-RS resource (i.e., ZP CSI-RS resource) proposed by the present invention is explained based on the contents mentioned earlier in the foregoing description.

In the following, for clarity, the present invention is explained based on 3GPP LTE system. Yet, a range of a system to which the present invention is applied can also be extended to a different system as well as the 3GPP LTE system.

And, embodiments of the present invention can also be applied in a manner of being extended to a case that a resource of at least one or more cells (or component carrier (CC)) is dynamically changed according to a load state of a system in environment to which carrier aggregation (CA) is applied. And, the embodiments of the present invention can also be applied in a manner of being extended to a case that a usage of a radio resource is dynamically changed in a TDD system or a FDD system.

Moreover, in the present invention, legacy downlink radio resources can be mainly divided into two types due to a dynamic change of a radio resource usage. As an example, the legacy downlink radio resources can be divided into a resource set (i.e., (semi-) static resource) used for a (semi-) static (or fixed) usage and a resource set (i.e., flexible resource) that a usage of the resource set is dynamically changing.

For instance, among downlink subframe(s) configured via SIB 1 UL-DL configuration (hereinafter, DL SF(s)) and/or a special SF(s) (hereinafter, S SF(s)), subframes used as the DL SF(s) and/or the S SF(s) in RRC-configured DL reference configuration can be defined as the (semi-)static downlink resource set ((semi-)static DL resource set). On the contrary, among UL SF(s) and/or S SF(s) configured via the SIB 1 UL-DL configuration, subframes used as the DL SF(s) in RRC-configured DL reference configuration can be defined as the flexible downlink resource set (flexible DL resource set). As a different example, DL SF(s) and/or S SF(s) configured via SIB 1 UL-DL configuration can be defined as a (semi-)static downlink resource set. On the contrary, among UL SF(s) and/or S SF(s) configured via the SIB 1 UL-DL configuration, subframes used as DL SF(s) in RRC-configured SL reference configuration can be defined as the flexible DL resource set. Moreover, in the aforementioned example, the SIB 1 UL-DL configuration can also be interpreted as UL reference configuration.

Figure 10:
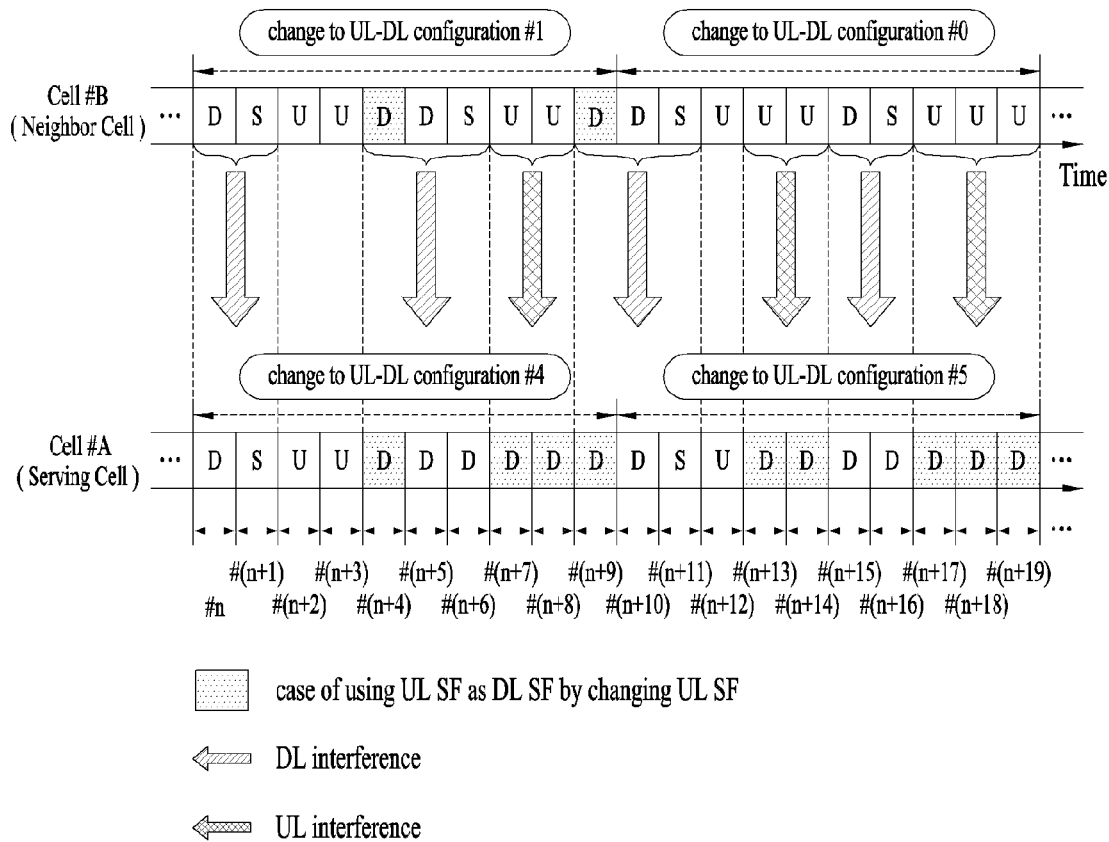
FIG. 10 is a diagram for a case that interference characteristics received from external are different from each other according to a subframe (or a subframe set) when each cell changes a usage of a legacy radio resource according to a system load of each cell in TDD system environment.

Moreover, when adjacent cells different from each other perform dynamic change of a radio resource usage, although a specific cell uses resources for DL usage, characteristics of interference received from external may be different from each other according to a resource. FIG. 10 shows an embodiment for a case that interference characteristics received from external are different from each other according to a subframe set when each cell dynamically changes a usage of a legacy radio resource according to a system load of each cell in TDD system environment, although a specific cell uses resources (e.g., DL SF or DwPTS in S SF) for DL usage.

In FIG. 10, assume a situation that two cells (i.e., cell #A and cell #B) exist on a network. Assume that SIB 1 UL-DL configurations of the two cells are identically configured by UL-DL configuration #0 (i.e., DSUUUDSUUU) and assume that RRC-configured DL reference configuration of the cell #A and RRC-configured DL reference configuration of the cell #B are configured by UL-DL configuration #2 (i.e., DSUDDDSUDD) and UL-DL configuration #5 (i.e., DSUDDDDDDD), respectively. And, assume that a dynamic change period of a radio resource usage of the two cells is identically configured. Moreover, assume that actual UL-DL configurations of the cell #A and the cell #B are configured by a configuration #1 (i.e., DSUUDDSUUD) and a UL-DL configuration #4 (i.e., DSUUDDDDDD), respectively, during a first radio frame section (i.e., a section from a SF #N to a SF # (N+9) and assume that actual UL-DL configurations of the cell #A and the cell #B are configured by a configuration #0 (i.e., DSUUUDSUUU) and a UL-DL configuration #5 (i.e., DSUDDDDDDD), respectively, during a second radio frame section (i.e., a section from a SF #(N+10) to a SF # (N+19)).

As shown in FIG. 10, in terms of the cell #A, types of interference received in subframes used for downlink usage can be classified into i) interference caused by downlink communication of the cell #B (i.e., interference received at positions of SF #N, SF #(N+1), SF #(N+4), SF #(N+5), SF #(N+6), SF #(N+9), SF #(N+10), SF #(N+11), SF #(N+15) and SF #(N+16) and ii) interference caused by uplink communication of the cell #B (i.e., interference received at positions of SF #(N+7), SF #(N+8), SF #(N+13), SF #(N+14), SF #(N+17), SF #(N+18) and SF #(N+19)).

Hence, as shown in FIG. 10, in order to independently deduct channel state information (CSI) and/or interference estimation (interference measurement) information according to a subframe set of which interference characteristics is different from each other, it is necessary to efficiently configure a restricted CSI measurement SF set(s) and a CSI-IM resource configuration(s).

For instance, in FIG. 10, a restricted CSI measurement SF set #0 (hereinafter, "$C_{CSL,\ 0}$") can be configured to include SF #N, SF #(N+1), SF #(N+5), SF #(N+6), SF #(N+10), SF #(N+11), SF #(N+15) and SF #(N+16) in consideration of (semi-)static downlink interference coming from a cell #B. On the contrary, a restricted CSI measurement SF set #1 (hereinafter, "$C_{CSL,\ 1}$") can be configured to include SF #(N+4), SF #(N+7), SF #(N+8), SF #(N+9), SF #(N+13), SF #(N+14), SF #(N+17), SF #(N+18) and SF #(N+19) in consideration of flexible interference (i.e., interference characteristics is changing as time goes by) coming from the cell #B.

Yet, as shown in Table 3 and Table 4, since a legacy CSI-IM resource configuration(s) capable of being set to a UE (i.e., TM 10 UE) is defined to always satisfy a restriction of "A UE is not expected to receive CSI-IM resource configuration(s) that are not all completely overlapping with one zero-power CSI-RS resource configuration which can be configured for the UE" (i.e., all of the CSI-IM resource configuration(s) set to the UE should be covered by a period of 5 ms), due to the restriction, it is unable to configure a CSI-IM resource to be simultaneously distributed on restricted CSI measurement SF sets different from each other. Moreover, Table 3 shows contents on CSI-IM resource configuration(s) of 3GPP TS 36.213 according to a legacy LTE standard and ZP (zero power) CSI-RS resource configuration(s).

TABLE 3

7.2.6 Channel-State Information - Interference Measurement (CSI-IM) Resource definition [1]

For a serving cell and UE configured in transmission mode 10, the UE can be configured with one or more CSI-IM resource configuration(s). The following parameters are configured via higher layer signaling for each CSI-IM resource configuration:
Zero-power CSI RS Configuration (see Table 6.10.5.2-1 and Table 6.10.5.2-2 in [2])
Zero-power CSI RS subframe configuration $I_{CSI-RS}$. The allowable values are given in sub-clause 6.10.5.3 of [2].
A UE is not expected to receive CSI-IM resource configuration(s) that are not all completely overlapping with one zero-power CSI-RS resource configuration which can be configured for the UE. A UE is not expected to receive a CSI-IM resource configuration that is not completely overlapping with one of the zero-power CSI-RS resource configurations defined in sub-clause 7.2.7.
A UE should not expect the configuration of CSI-IM resource and PMCH in the same subframe of a serving cell.
7.2.7 Zero Power CSI-RS Resource definition [1]

For a serving cell and UE configured in transmission mode 1-9, the UE can be configured with one zero-power CSI-RS resource configuration. For a serving cell and UE configured in transmission mode 10, the UE can be configured with one or more zero-power CSI-RS resource configuration(s).
The following parameters are configured via higher layer signaling for each zero-power CSI-RS resource configuration:
Zero-power CSI RS Configuration list (16-bit bitmap ZeroPowerCSI-RS in [2])
Zero-power CSI RS subframe configuration $I_{CSI-RS}$. The allowable values are given in sub-clause 6.10.5.3 of [2].
A UE should not expect the configuration of zero-power CSI-RS and PMCH in the same subframe of a serving cell.
For frame structure type 1, the UE is not expected to receive the 16-bit bitmap ZeroPowerCSI-RS with any one of the 6 LSB bits set to 1 for the normal CP case, or with any one of the 8 LSB bits set to 1 for the extended CP case.
For frame structure type 2 and 4 CRS ports, the UE is not expected to receive the 16-bit bitmap ZeroPowerCSI-RS with any one of the 6 LSB bits set to 1 for the normal CP case, or with any one of the 8 LSB bits set to 1 for the extended CP case
6.10.5 CSI reference signals [2]

CSI reference signals are transmitted on one, two, four or eight antenna ports using p = 15, p =15, 16, p = 15, . . . ,18 and p = 15, . . . ,22, respectively. CSI reference signals are defined for Δf = 15 kHz only.

TABLE 3-continued 6.10.5.1 Sequence generation [2]

The reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)), m = 0, 1, \ldots, N_{RB}^{max,DL} - 1$$

where $n_s$ is the slot number within a radio frame and l is the OFDM symbol number within the slot. The pseudo-random sequence c(i) is defined in clause 7.2. The pseudo-random sequence generator shall be initialized with $c_{int} = 2^{10} \cdot (7 \cdot (n_s + 1) + l + 1) \cdot (2 \cdot N_{ID}^{CSI} + 1) + 2 \cdot N_{ID}^{CSI} + N_{CP}$ at the start of each OFDM symbol where $$N_{CP} = \begin{cases} 1 & \text{for normal CP} \\ 0 & \text{for extended CP} \end{cases}$$

The quantity $N_{ID}^{CSI}$ equals $N_{ID}^{cell}$ unless configured by higher layers.

6.10.5.2 Mapping to resource elements [2]

In subframes configured for CSI reference signal transmission, the reference signal sequence $r_{l,n_s}(m)$ shall be mapped to complex-valued modulation symbols $a_{k,l}^{(p)}$ used as reference symbols on antenna port p according to
$a_{k,l}^{(p)} = w_{l''} \cdot r_{l,n_s}(m')$
where $$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations 0-9, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$l'' = 0, 1$
$m = 0, 1, \ldots, N_{RB}^{DL} - 1$ $$m' = m + \left\lfloor \frac{N_{RB}^{max,DL} - N_{RB}^{DL}}{2} \right\rfloor$$

The quantity (k', l') and the necessary conditions on $n_s$ are given by Tables 6.10.5.2-1 and 6.10.5.2-2 for normal and extended cyclic prefix, respectively.
Multiple CSI reference signal configurations can be used in a given cell. A UE can be configured with multiple sets of CSI reference signals,
up to three configurations for which the UE shall assume non-zero transmission power for the CSI-RS, and
zero or more configurations for which the UE shall assume zero transmission power.
The CSI-RS configurations for which the UE shall assume non-zero transmission power are provided by higher layers.
The CSI-RS configurations for which the UE shall assume zero transmission power in a subframe are given by a bitmap derived according to clause 7.2.7 in 3GPP TS 36.213 [1]. For each bit set to one in the 16-bit bitmap, the UE shall assume zero transmission power for the resource elements corresponding to the four CSI reference signal column in Tables 6.10.5.2-1 and 6.10.5.2-2 for normal and extended cyclic prefix, respectively, except for resource elements that overlap with those for which the UE shall assume non-zero transmission power CSI-RS as configured by higher layers. The most significant bit corresponds to the lowest CSI reference signal configuration index and subsequent bits in the bitmap correspond to configurations with indices in increasing order.
CSI reference signals can only occur in
downlink slots where $n_s$ mode fulfils the condition in Tables 6.10.5.2-1 and 6.10.5.2-2 for normal and extended cyclic prefix, respectively, and
where the subframe number fulfils the conditions in clause 6.10.5.3.
The UE shall assume that CSI reference signals are not transmitted
in the special subframe(s) in case of frame structure type 2,
in subframes where transmission of a CSI-RS would collide with TABLE 3-continued SystemInformationBlockType1 messages,
in the primary cell in subframes configured for transmission of paging messages in the
primary cell for any UE with the cell-specific paging configuration.
The UE shall assume that none of the CSI reference signals corresponding to a CSI reference
signal configuration are transmitted in subframes where transmission of any of those CSI
reference signals would collide with transmission of synchronization signals or PBCH.
Resource elements (k, l) used for transmission of CSI reference signals on any of the antenna
ports in the set S, where S = {15}, S = {15, 16}, S = {17, 18}, S = {19, 20} or S = {21, 22} shall not be
for transmission of PDSCH on any antenna port in the same slot Table 6.10.5.2-1: Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| structure type 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 6.10.5.2-2: Mapping from CSI reference signal configuration to (k', l') for extended cyclic prefix.

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| u | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |

TABLE 3-continued

| | | |
|---|---|---|
| 22 | (8, 1) | 1 |
| 23 | (7, 1) | 1 |
| 24 | (6, 1) | 1 |
| 25 | (2, 1) | 1 |
| 26 | (1, 1) | 1 |
| 27 | (0, 1) | 1 |

6.10.5.3 CSI reference signal subframe configuration [2]

The subframe configuration period $T_{CSI\text{-}RS}$ and the subframe offset $\Delta_{CSI\text{-}RS}$ for the occurrence of CSI reference signals are listed in Table 6.10.5.3-1. The parameter $I_{CSI\text{-}RS}$ can be configured separately for CSI reference signals for which the UE shall assume non-zero and zero transmission power. Subframes containing CSI reference signals shall satisfy $(10n_f + \lfloor n_s/2 \rfloor - \Delta_{CSI\text{-}RS}) \bmod T_{CSI\text{-}RS} = 0$.

Table 6.10.5.3-1: CSI reference signal subframe configuration

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0 – 4 | 5 | $I_{CSI\text{-}RS}$ |
| 5 – 14 | 10 | $I_{CSI\text{-}RS} - 5$ |
| 15 – 34 | 20 | $I_{CSI\text{-}RS} - 15$ |
| 35 – 74 | 40 | $I_{CSI\text{-}RS} - 35$ |
| 75 – 154 | 80 | $I_{CSI\text{-}RS} - 75$ |

Table 4 shows contents on CSI-IM resource configuration(s) of 3GPP TS 36.331 according to a LTE standard and ZP (zero power) CSI-RS resource configuration(s).

TABLE 4

- CSI-IM-Config [3]
The IE CSI-IM-Config is the CSI Interference Measurement (IM) configuration that E-UTRAN may configure on a serving frequency, see TS 36.213 [23, 7.2.6].
CSI-IM-Config information elements

```
-- ASN1START
CSI-IM-Config-r11 ::=        SEQUENCE {
    csi-IM-ConfigId-r11          CSI-IM-ConfigId-r11,
    resourceConfig-r11           INTEGER (0..31),
    subframeConfig-r11           INTEGER (0..154),
    ...
}
-- ASN1STOP
```
CSI-IM-Config field descriptions resourceConfig
Parameter: CSI reference signal configuration, see TS 36.213 [23, 7.2.6] and TS 36.211 [21, table 6.10.10.5.2-1 and 6.10.5.2-2] for 4 REs.
subframeConfig
Parameter: $I_{CSI\text{-}RS}$, see TS 36.213 [23, 7.2.6] and TS 36.211 [21, table 6.10.5.3-1].
- CSI-IM-ConfigId [3]
The IE CSI-IM-ConfigId is used to identify a CSI-IM configuration that is configured by the IE CSI-IM-Config. The identity is unique within the scope of a carrier frequency.
CSI-IM-ConfigId information elements

```
-- ASN1START
CSI-IM-ConfigId-r11 ::=              INTEGER (1..maxCSI-IM-r11)
-- ASN1STOP
```
- CSI-Process [3]
The IE CSI-Process is the CSI process configuration that E-UTRAN may configure on a serving frequency.
CSI-Process information elements

```
-- ASN1START
CSI-Process-r11 ::=      SEQUENCE {
    csi-ProcessId-r11            CSI-ProcessId-r11,
    csi-RS-ConfigNZPId-r11       CSI-RS-ConfigNZPId-r11,
    csi-IM-ConfigId-r11          CSI-IM-ConfigId-r11,
    p-C-AndCBSRList-r11 SEQUENCE (SIZE (1..2)) OF P-C-AndCBSR-r11,
    cqi-ReportBothProc-r11       CQI-ReportBothProc-r11         OPTIONAL,     --
Need OR
    cqi-ReportPeriodicProcId-r11    INTEGER (0..maxCQI-ProcExt-r11)    OPTIONAL,
    cqi-ReportAperiodicProc-r11     CQI-ReportAperiodicProc-r11       OPTIONAL,     --
Need OR
```

TABLE 4-continued

```
...
}
P-C-AndCBSR-r11 ::= SEQUENCE {
    p-C-r11                          INTEGER (-8..15),
    codebookSubsetRestriction-r11 BIT STRING
}
-- ASN1STOP
```

CSI-Process field descriptions cqi-ReportBothProc
Includes CQI configuration parameters applicable for both aperiodic and periodic CSI
reporting, for which CSI process specific values may be configured. E-UTRAN configures
the field if and only if cqi-ReportPeriodicId is included and/or if cqi-ReportAperiodicProc
is included.
cqi-ReportPeriodicId
Refers to a periodic CQI reporting configuration that is configured for the same frequency
as the CSI process. Value 0 refers to the set of parameters defined by the REL-10 CQI
reporting configuration fields, while the other values refer to the additional configurations
E-UTRAN assigns by CQI-ReportPeriodicProcExt-r11 (and as covered by CQI-
ReportPeriodicProcExtId).
csi-IM-ConfigId
Refers to a CSI-IM configuration that is configured for the same frequency as the CSI
process.
csi-RS-ConfigNZPId
Refers to a CSI RS configuration using non-zero power transmission that is configured for
the same frequency as the CSI process.
p-C
Parameter: $P_c$, see TS 36.213 [23, 7.2.5].
p-C-AndAntennaInfoDedList
A p-C-AndAntennaInfoDedList including 2 entries indicates that the subframe patterns
configured for CSI (CQI/PMI/PTI/RI) reporting (i.e. as defined by field csi-
MeasSubframeSet1 and csi-MeasSubframeSet2) are to be used for this CSI process, while
a single entry indicates that the subframe patterns are not to be used for this CSI process.
E-UTRAN does not include 2 entries in p-C-AndAntennaInfoDedList for CSI processes
concerning a secondary frequency. E-UTRAN includes 2 entries in p-C-
AndAntennaInfoDedList when configuring both cqi-pmi-ConfigIndex and cqi-pmi-
ConfigIndex2.
- CSI-ProcessId [3]
The IE CSI-ProcessId is used to identify a CSI process that is configured by the IE CSI-
Process. The identity is unique within the scope of a carrier frequency.

CSI-ProcessId information elements

```
-- ASN1START
CSI-ProcessId-r11 ::=       INTEGER (1..maxCSI-Proc-r11)
-- ASN1STOP
```
- CSI-RS-Config [3]
The IE CSI-RS-Config is used to specify the CSI (Channel-State Information) reference
signal configuration.

CSI-RS-Config information elements

```
-- ASN1START
CSI-RS-Config-r10 ::=       SEQUENCE {
    csi-RS-r10                  CHOICE {
        release                     NULL,
        setup                       SEQUENCE {
            antennaPortsCount-r10       ENUMERATED 1 an1, an2, an4, an8},
            resourceConfig-r10          INTEGER (0..31),
            subframeConfig-r10          INTEGER (0..154),
            p-C-r10                     INTEGER (-8..15)
        }
    }                                                           OPTIONAL,    --
Need ON
    zeroTxPowerCSI-RS-r10       CHOICE {
        release                     NULL,
        setup                       SEQUENCE {
            zeroTxPowerResourceConfigList-r10   BIT STRING (SIZE (16)),
            zeroTxPowerSubframeConfig-r10       INTEGER (0..154)
        }
    }                                                           OPTIONAL     --
Need ON
}
-- ASN1STOP
```

CSI-RS-Config field descriptions antennaPortsCount
Parameter represents the number of antenna ports used for transmission of CSI reference
signals where value and corresponds to 1 antenna port, an2 to 2 antenna ports and so on,
see TS 36.211 [21, 6.10.5].
p-C
Parameter: $P_c$, see TS 36.213 [23, 7.2.5].

TABLE 4-continued resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
zeroTxPowerResourceConfigList
Parameter: ZeroPowerCSI-RS, see TS 36.213 [23, 7.2.7].
zeroTxPowerSubframeConfig
Parameter: $I_{CSI-RS}$, see TS 36.211 [21, table 6.10.5.3-1].
- CSI-RS-ConfigNZP [3]
The IE CSI-RS-ConfigNZP is the CSI-RS resource configuration using non-zero power transmission that E-UTRAN may configure on a serving frequency.

CSI-RS-ConfigNZP information elements

```
-- ASN1START
CSI-RS-ConfigNZP-r11 ::=          SEQUENCE {
    csi-RS-ConfigNZPId-r11            CSI-RS-ConfigNZPId-r11,
    antennaPortsCount-r11             ENUMERATED {an1, an2, an4, an8},
    resourceConfig-r11                INTEGER (0..31),
    subframeConfig-r11                INTEGER (0..154),
    scramblingIdentity-r11            INTEGER (0..503),
    qcl-CRS-Info-r11                  SEQUENCE {
        qcl-ScramblingIdentity-r11        INTEGER (0..503),
        crs-PortsCount-r11                ENUMERATED {n1, n2, n4, sparel},
        mbsfn-SubframeConfigList-r11      CHOICE {
            release                           NULL,
            setup                             SEQUENCE {
                subframeConfigList                MBSFN-SubframeConfigList
            }
        }                                                          OPTIONAL    --
Need ON
    }                                                              OPTIONAL,   --
Need OR
    ...
}
-- ASN1STOP
```

CSI-RS-ConfigNZP field descriptions antennaPortsCount
Parameter represents the number of antenna ports used for transmission of CSI reference signals where an1 corresponds to 1, an2 to 2 antenna ports etc. see TS 36.211 [21, 6.10.5].
qcl-CRS-Info
Indicates CRS antenna ports that is quasi co-located with the CSI-RS antenna ports, see TS 36.213 [23, 7.2.5]. EUTRAN configures this field if and only if the UE is configured with qcl-Operation set to typeB.
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
scramblingIdentity
Parameter: Pseudo-random sequence generator parameter, $n_{ID}$, see TS 36.213 [23, 7.2.5].
- CSI-RS-ConfigNZPId [3]
The IE CSI-RS-ConfigNZPId is used to identify a CSI-RS resource configuration using non-zero transmission power, as configured by the IE CSI-RS-ConfigNZP. The identity is unique within the scope of a carrier frequency.

CSI-RS-ConfigNZPId information elements

```
-- ASN1START
CSI-RS-ConfigNZPId-r11 ::=                        INTEGER (1..maxCSI-RS-NZP-r11)
-- ASN1STOP
```
- CSI-RS-ConfigZP [3]
The IE CSI-RS-ConfigZP is the CSI-RS resource configuration, for which UE assumes zero transmission power, that E-UTRAN may configure on a serving frequency.

CSI-RS-ConfigZP information elements

```
-- ASN1START
CSI-RS-ConfigZP-r11 ::=          SEQUENCE {
    csi-RS-ConfigZPId-r11            CSI-RS-ConfigZPId-r11,
    resourceConfigList-r11           BIT STRING (SIZE (16)),
    subframeConfig-r11               INTEGER (0..154),
    ...
}
-- ASN1STOP
```

CSI-RS-ConfigZP field descriptions resourceConfigList
Parameter: ZeroPowerCSI-RS, see TS 36.213 [23, 7.2.7].
subframeConfig
Parameter: $I_{CSI-RS}$, see TS 36.211 [21, table 6.10.5.3-1].

TABLE 4-continued

- CSI-RS-ConfigZPId [3]
The IE CSI-RS-ConfigZPId is used to identify a CSI-RS resource configuration for which UE
assumes zero transmission power, as configured by the IE CSI-RS-ConfigZP. The identity is
unique within the scope of a carrier frequency.
CSI-RS-ConfigZPId information elements -- ASN1START
CSI-RS-ConfigZPId-r11 ::=           INTEGER (1..maxCSI-RS-ZP-r11)
-- ASN1STOP Hence, in order to solve the aforementioned problem, it is necessary to modify configuration/definition of the legacy CSI-IM resource configuration(s) or configuration/definition of the legacy ZP CSI-RS resource configuration(s). Table 5 shows an example of a method of configuring/defining a new CSI-IM resource configuration(s). Moreover, configurations and definitions explained in Table 5 can be limitedly applied to a UE operating in TM 10 only.

TABLE 5

Minimum UE capability on the number of CSI processes for TDD eIMTA
is one
For a Rel-12 UE configured with TDD eIMTA and capable of one CSI
  process, up to two Rel-11 CSI-IM resources is supported for one CSI
  process.
FFS between the following approaches to support this:
  [Alt #1] One Rel-12 CSI-IM resource is defined to contain up to two
  Rel-11 CSI-IM resources, i.e. one or two sets of {resourceConfig,
  subframeConfig} [3]
  [Alt #2] One Rel-12 CSI process is defined to contain up to two CSI-
IM
    resources, i.e. one or two CSI-IM-ConfigId [3]
(This new configuration is also supported for 2, 3 and 4 configured CSI
processes.)

First of all, [Alt #1] shown in Table 5 is explained in detail. While a Rel-12 CSI-IM resource configuration is set to a CSI process, unlike a legacy configuration (i.e., a case of defining a single {resourceConfig, subframeConfig} only), the Rel-12 CSI-IM resource configuration can be defined by maximum two {resourceConfig, subframeConfig} (i.e., refer to CSI-IM-Config IE in Table 4). By doing so, it may be able to obtain an effect capable of configuring maximum two CSI-IM resource configurations including a period/offset (and/or RE position) different from each other on a CSI process.

On the contrary, [Alt #2] shown in Table 5 corresponds to a method that an individual CSI-IM resource configuration has a {resourceConfig, subframeConfig}, respectively, while maximum two CSI-IM resource configurations are set to a CSI process. In this case, the maximum two CSI-IM resource configurations set to a CSI process have a CSI-IM-ConfigId (i.e., refer to CSI-IM-ConfigId IE in Table 4) different from each other, respectively.

Embodiments of the present invention described in the following correspond to a method of efficiently configuring/defining ZP CSI-RS resource configuration(s) when configuration/definition of the new CSI-IM resource configuration(s) mentioned earlier in Table 5 is applied. In other word, the embodiments described in the following relate to configuration/definition of a ZP CSI-RS resource configuration(s) used for efficiently covering/overlapping resource areas (in terms of PDSCH rate matching) in which the new CSI-IM resource configuration(s) based on Table 5 is appearing.

Method 1

Unlike a legacy configuration (i.e., a case of defining a {resourceConfigList, subframeConfig} only), it may be able to configure a ZP CSI-RS resource configuration (e.g., Rel-12 ZP CSI-RS resource configuration) to be defined by maximum two {resourceConfigList, subframeConfig} (i.e., refer to CSI-RS-ConfigZP IE in Table 4).

For instance, according to the method 1, it may be able to obtain an effect of defining maximum two ZP CSI-RS resource configurations including a period/offset (and/or RE position) different from each other via a ZP CSI-RS resource configuration. And, it may be able to cover/overlap resource areas (in terms of PDSCH rate matching) in which the aforementioned new CSI-IM resource configuration(s) based on Table 5 is appearing. And, according to the method 1, unlike a legacy configuration (i.e. a case of defining a {resourceConfigList, subframeConfig} only), it may be able to configure a CSI-IM resource configuration, which is set to a CSI process, to be limitedly applied to a case of defining the CSI-IM resource configuration by maximum two {resourceConfigList, subframeConfig} (i.e., refer to CSI-IM-Config IE in Table 4). Hence, an example of a case to which the method 1 is applied is concretely shown in Table 6 in the following.

TABLE 6

-- ASN1START
CSI-RS-ConfigZP ::=         SEQUENCE {
    csi-RS-ConfigZPId           CSI-RS-ConfigZPId-r11,
    resourceConfigList (1)           BIT STRING (SIZE (16)),
    subframeConfig (1)          INTEGER (0..154),
    resourceConfigList (2)           BIT STRING (SIZE (16)),
    subframeConfig (2)          INTEGER (0..154),
    ...
}
-- ASN1STOP As a different example, it may be able to configure a ZP CSI-RS resource configuration to be defined as Table 7 in the following. In this case, Table 7 can be interpreted as one ZP CSI-RS resource configuration is defined by maximum two {resourceConfigList, subframeConfig (1)}, {resourceConfigList, subframeConfig (2)} (i.e., the resourceConfigList is commonly used and the subframeConfig has a form different from each other).

TABLE 7

-- ASN1START
CSI-RS-ConfigZP ::=         SEQUENCE {
    csi-RS-ConfigZPId           CSI-RS-ConfigZPId-r11,
    resourceConfigList          BIT STRING (SIZE (16)),
    subframeConfig (1)          INTEGER (0..154),
    subframeConfig (2)          INTEGER (0..154),
    ...
}
-- ASN1STOP In addition, one ZP CSI-RS resource configuration can be defined by maximum two {resourceConfigList (1), subframeConfig}, {resourceConfigList (2), subframeConfig} (i.e., the subframeConfig is commonly used and the resourceConfigList has a form different from each other).

As a further different example, the method 1 applied for a ZP CSI-RS resource configuration can also be applied to a NZP CSI-RS resource configuration. By doing so, it may be able to perform aperiodic NZP CSI-RS transmission. And, it may be able to configure the method 1 to be limitedly applied to a UE operating in TM 10 only.

Method 2

According to the method 2 of the present invention, in order to cover/overlap resource areas in which the new CSI-IM resource configuration(s) mentioned earlier in Table 5 is appearing in terms of PDSCH rate matching, it may be able to configure maximum two ZP CSI-RS resource configuration(s) (e.g., Rel-11 ZP CSI-RS resource configuration(s)).

According to the method 1 of the present invention, maximum two ZP CSI-RS resource configuration(s) (e.g., CSI-RS-ConfigZP (1) and CSI-RS-ConfigZP in Table 8) have a csi-RS-ConfigZPID different from each other, respectively (i.e., refer to CSI-RS-ConfigZP IE in Table 4).

An example for a case to which the method 2 is applied is shown in Table 8 in the following. And, as an example, it may be able to configure the method 2 to be limitedly applied to a UE operating in TM 10 only.

TABLE 8

| | |
|---|---|
| -- ASN1START | |
| CSI-RS-ConfigZP (1) ::= | SEQUENCE { |
|     csi-RS-ConfigZPId (1) | CSI-RS-ConfigZPId-r11, |
|     resourceConfigList (1) | BIT STRING (SIZE (16)), |
|     subframeConfig (1) | INTEGER (0..154), |
|     ... | |
| } | |
| CSI-RS-ConfigZP (2) ::= | SEQUENCE { |
|     csi-RS-ConfigZPId (2) | CSI-RS-ConfigZPId-r11, |
|     resourceConfigList (2) | BIT STRING (SIZE (16)), |
|     subframeConfig (2) | INTEGER (0..154), |
|     ... | |
| } | |
| -- ASN1STOP | |

As a different example, when a new CSI-IM resource configuration is configured based on the [Alt #1] of Table 5, it may be able to configure maximum two ZP CSI-RS resource configuration(s) including a csi-RS-ConfigZPID different from each other mentioned earlier in the method 2 to cover/overlap maximum two {resourceConfigList, subframeConfig} (in terms of PDSCH rate matching).

In this case, it may be able to define an additional signaling (or implicit configuration) to make a specific {resourceConfigList, subframeConfig}-based CSI-IM resource have an interworking relation (linkage) with a csi-RS-ConfigZPID-based ZP CSI-RS resource configuration.

Method 3

A UE operating in TM 1 to 9 according to a legacy wireless communication system used to be configured by a ZP CSI-RS resource configuration only (for a specific cell). Yet, in case of a cell (i.e., "eIMTA-enabled cell") operating in a dynamic change mode of a radio resource usage, a UE operating in TM 1 to 9 and a UE operating in TM 10 may exist together in the cell.

In case of the UE operating in the TM 10, i) if the UE is managed according to a new CSI-IM resource configuration(s) based on the aforementioned Table 5 and/or ii) if configuration/definition of a new ZP CSI-RS resource configuration(s) based on the aforementioned method 1 or the method 2 is applied to the UE, it is necessary to inform the UE operating in the TM 1 to 9 in the corresponding cell of proper PDSCH RE mapping assumption (and/or EPDCCH RE mapping assumption) in a flexible downlink resource set (e.g., subframes used as DL SF(s) on RRC-configured DL reference configuration among UL SF(s) on SIB 1 UL-DL configuration and/or S SF(s)).

Hence, according to the present invention, maximum two ZP CSI-RS resource configurations (e.g., Rel-11 ZP CSI-RS resource configurations) can be set to the UE operating in the TM 1 to 9. In this case, as an example, an individual ZP CSI-RS resource configuration (e.g., zeroTxPowerCSI-RS (1) and zeroTxPowerCSI-RS (2) in Table 9) can be defined to have a {zeroTxPowerResourceConfigList, zeroTxPowerSubframeConfig}, respectively. And, as an example, this rule (i.e., the rule of setting the maximum two ZP CSI-RS resource configurations to the UE operating in TM 1 to 9) can be defined to be limitedly applied to the UE operating in the TM 1 to 9 only when a restricted CSI measurement (or resource-specific CSI measurement) is set to the UE operating in the TM 1 to 9.

Hence, according the method 3, it is able to inform the UE operating in the TM 1 to 9 of a proper PDSCH RE mapping assumption (and/or EPDCCH RE mapping assumption)(in a flexible downlink resource set) irrespective of a TM 10 operation managed by configuration/definition of a new CSI-IM resource configuration(s) based on the aforementioned Table 5.

An example for a case to which the present invention is applied is shown in Table 9 in the following. Table 9 shows a case that the method 3 is implemented based on a CSI-RS-Config IE form of Rd-10 in Table 4. Table 10 in the following shows an example for a case that the method 3 is implemented (i.e., the method 3 can also be applied to a UE operating in TM 10) based on a CSI-RS-ConfigZP IE form of Rel-11 in Table 4.

TABLE 9

| | | |
|---|---|---|
| -- ASN1START | | |
| CSI-RS-Config ::= | SEQUENCE { | |
|   csi-RS | CHOICE { | |
|     release | | NULL, |
|     setup | | SEQUENCE { |
| | antennaPortsCount | ENUMERATED {an1, an2, an4, an8}, |
| | resourceConfig | INTEGER (0..31), |
| | subframeConfig | INTEGER (0..154), |
| | p-C | INTEGER (−8..15) |
|     } | | |
|   } | | OPTIONAL, -- |

TABLE 9-continued

```
Need ON
    zeroTxPowerCSI-RS (1)          CHOICE {
        release                        NULL,
        setup                          SEQUENCE {
            zeroTxPowerResourceConfigList (1)    BIT STRING
(SIZE (16)),
            zeroTxPowerSubframeConfig (1)        INTEGER (0..154)
        }
    }                              OPTIONAL       --
Need ON
    zeroTxPowerCSI-RS (2)          CHOICE {
        release                        NULL,
        setup                          SEQUENCE {
            zeroTxPowerResourceConfigList (2)    BIT STRING
(SIZE (16)),
            zeroTxPowerSubframeConfig (2)        INTEGER (0..154)
        }
    }                              OPTIONAL       --
Need ON
}
-- ASN1STOP
```

TABLE 10

```
-- ASN1START
CSI-RS-ConfigZP (1) ::=        SEQUENCE {
    csi-RS-ConfigZPId (1)          CSI-RS-ConfigZPId-r11,
    resourceConfigList (1)         BIT STRING (SIZE (16)),
    subframeConfig (1)             INTEGER (0..154),
    ...
}
CSI-RS-ConfigZP (2) ::=        SEQUENCE {
    csi-RS-ConfigZPId (2)          CSI-RS-ConfigZPId-r11,
    resourceConfigList (2)         BIT STRING (SIZE (16)),
    subframeConfig (2)             INTEGER (0..154),
    ...
}
-- ASN1STOP
```

As a different example, one ZP CSI-RS resource configuration can be set to a UE operating in TM 1 to 9 in such a form of zeroTxPowerCSI-RS as shown in Table 11 in the following. The configuration shown in Table 11 can be interpreted as one ZP CSI-RS resource configuration is defined by maximum two {zeroTxPowerResourceConfigList (1), zeroTxPowerSubframeConfig (1)}, {zeroTxPowerResourceConfigList (2), zeroTxPowerSubframeConfig (2)}.

Moreover, the configuration shown in Table 11 can obtain an effect of defining maximum two ZP CSI-RS resource configurations including a period/offset (and/or RE position) different from each other via one ZP CSI-RS resource configuration.

TABLE 11

```
-- ASN1START
CSI-RS-ConfigZP (1) ::=        SEQUENCE {
    csi-RS-ConfigZPId (1)          CSI-RS-ConfigZPId-r11,
    resourceConfigList (1)         BIT STRING (SIZE (16)),
    subframeConfig (1)             INTEGER (0..154),
    ...
}
CSI-RS-ConfigZP (2) ::=        SEQUENCE {
    csi-RS-ConfigZPId (2)          CSI-RS-ConfigZPId-r11,
    resourceConfigList (2)         BIT STRING (SIZE (16)),
    subframeConfig (2)             INTEGER (0..154),
    ...
}
-- ASN1STOP
```

As a further different example, one ZP CSI-RS resource configuration can be set to a UE operating in TM 1 to 9 by maximum two {zeroTxPowerResourceConfigList, zeroTxPowerSubframeConfig (1)}, {zeroTxPowerResourceConfigList, zeroTxPowerSubframeConfig (2)}. In particular, the zeroTxPowerResourceConfigList is commonly used and the zeroTxPowerSubframeConfig can be configured by a form different from each other.

In addition, one ZP CSI-RS resource configuration can be set to the UE operating in TM 1 to 9 by maximum two {zeroTxPowerResourceConfigList (1), zeroTxPowerSubframeConfig}, {zeroTxPowerResourceConfigList (2), zeroTxPowerSubframeConfig}. In particular, the zeroTxPowerSubframeConfig is commonly used and the zeroTxPowerResourceConfigList can be configured by a form different from each other.

As a further different example, the method 3 applied for a ZP CSI-RS resource configuration can also be applied for a NZP CSI-RS resource configuration. By doing so, it may be able to implement aperiodic NZP CSI-RS transmission. And, the method 3 can be configured to be limitedly applied to a UE operating in TM 1 to 9 only.

Method 4

A base station can inform a UE operating in a TM 10 of assumption on PDSCH RE mapping performed in a specific subframe via a PDSCH RE mapping and Quasi-Co-Location indicator (i.e., "PQI field") defined by a DCI format 2D.

Table 12 in the following shows a PDSCH resource mapping operation in a legacy wireless communication system. As shown in Table 12, maximum 4 ZP CSI-RS resource configurations (per carrier frequency) can be set to a UE operating in the TM 10. Yet, if a specific cell manages a radio resource dynamic change mode and a CoMP operation mode (i.e., the TM 10) at the same time, maximum two ZP CSI-RS resource configuration(s) are used to cover/overlap resource areas (in terms of PDSCH rate matching) in which a new CSI-IM resource configuration(s) based on the Table 5 is appearing set to the specific cell (i.e., eIMTA-enabled cell) (instead of being used for measuring interference of cells different from each other participating in the CoMP operation) using at least one selected from the group consisting of the method 1, the method 2 and the method 3 (e.g., moreover, it may also be interpreted as the maximum two ZP CSI-RS resource configuration(s) are used to measure interference of the specific cell). Hence, the use of the ZP CSI-RS resource configuration(s) decreases performance gain capable of being obtained from the CoMP operation.

TABLE 12

7.1.9 PDSCH resource mapping parameters [1]

A UE configured in transmission mode 10 for a given serving cell can be configured with up to 4 parameter sets by higher layer signaling to decode PDSCH according to a detected PDCCH/EPDCCH with DCI format 2 D intended for the UE and the given serving cell. The UE shall use the parameter set according to the value of the 'PDSCH RE Mapping and Quasi-Co-Location indicator' field (mapping defined in Table 7.1.9-1) in the detected PDCCH/EPDCCH with DCI format 2 D for determining the PDSCH RE mapping (defined in sub-clause 6.4 of [2]), and for determining PDSCH antenna port quasi co-location (defined in sub-clause 7.1.10 [1]) if the UE is configured with Type B quasi co-location type (defined in sub-clause 7.1.10 [1]). For PDSCH without a corresponding PDCCH/EPDCCH, the UE shall use the parameter set indicated in the PDCCH/EPDCCH with DCI format 2 D corresponding to the associated SPS activation for determining the PDSCH RE mapping (defined in sub-clause 6.4 of [2]) and PDSCH antenna port quasi co-location (defined in sub-clause 7.1.10 [1]).

Table 7.1.9-1: PDSCH RE Mapping and Quasi-Co-Location Indicator field in DCI format 2 D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port quasi co-location are configured via higher layer signaling for each parameter set:
crs-PortsCount-r11.
crs-FreqShift-r11.
mbsfn-SubframeConfigL1st-r11.
csi-RS-ConfigZPId-r11.
pdsch-Start-r11.
qcl-CSI-RS-ConfigNZPId-r11.
To decode PDSCH according to a detected PDCCH/EPDCCH with DCI format 1A with CRC scrambled with C-RNTI intended for the UE and the given serving cell and for PDSCH transmission on antenna port 7, a UE configured in transmission mode 10 for a given serving cell shall use the parameter set 1 in table 7.1.9-1 for determining the PDSCH RE mapping (defined in sub-clause 6.4 of [2]), and for determining PDSCH antenna port quasi co-location (defined in sub-clause 7.1.10 [1]) if the UE is configured with Type B quasi co-location type (defined in sub-clause 7.1.10 [1]).
To decode PDSCH corresponding to detected PDCCH/EPDCCH with DCI format 1A with CRC scrambled with SPS C-RNTI and PDSCH without a corresponding PDCCH/EPDCCH associated with SPS activation indicated in PDCCH/EPDCCH with DCI format 1A, a UE configured in transmission mode 10 for a given serving cell shall use the parameter set 1 in table 7.1.9-1 for determining the PDSCH RE mapping (defined in sub-clause 6.4 of [2]), and for determining PDSCH antenna port quasi co-location (defined in sub-clause 7.1.10 [1]) if the UE is configured with Type B quasi co-location type (defined in sub-clause 7.1.10 [1]).
To decode PDSCH according to a detected PDCCH/EPDCCH with DCI format 1A intended for the UE on a given serving cell and for PDSCH transmission on antenna port 0-3, a UE configured in transmission mode 10 for the given serving cell shall determine the PDSCH RE mapping (as described in sub-clause 6.4 of [2]) using the lowest indexed zero-power CSI-RS resource.

In order to solve the aforementioned problem, (maximum) two ZP CSI-RS resource configuration(s) (e.g., Rel-11 ZP CSI-RS resource configuration(s)) can be set to at least one or more (i.e., a part or all) PQI field values via an upper layer signal (e.g., RRC signaling). In this case, the (maximum) two ZP CSI-RS resource configuration(s) set to at least one or more (i.e., a part or all) PQI field values can be implemented by at least one selected from the group consisting of the method 1, the method 2 and the method 3.

As a concreate example, the (maximum) two ZP CSI-RS resource configuration(s) can be defined by independent CSI-RS-ConfigZP (1) and CSI-RS-ConfigZP (2) different from each other (i.e., csi-RS-ConfigZPId, resourceConfig-List and subframeConfig can be configured in a manner of being different from each other). A case to which the method 4 is applied is shown in Table 13 in the following.

TABLE 13

Table 7.1.9-1: PDSCH RE Mapping and Quasi-Co-Location Indicator field in DCI format 2 D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port quasi co-location are configured via higher layer signaling for each parameter set:
crs-PortsCount.
crs-FreqShift.
mbsfn-SubframeConfigList.
csi-RS-ConfigZPId (1).
csi-RS-ConfigZPId (2).
pdsch-Start.
qcl-CSI-RS-ConfigNZPId.

As a different example, a new ZP CSI-RS resource configuration defined by the aforementioned method 1 (e.g., Rel-12 ZP CSI-RS resource configuration) can be set to at least one or more (i.e., a part or all) PQI field values via an upper layer signal (e.g., RRC signaling).

In this case, although a new ZP CSI-RS resource configuration (i.e., one csi-RS-ConfigZPId) is set to at least one or more (i.e., a part or all) PQI field values using the method 4, it may be able to obtain an effect identical to an effect of defining maximum two ZP CSI-RS resource configurations including a period/offset (and/or RE position) different from each other.

An example for a case to which the method 4 is applied is shown in Table 14 in the following. As a different example, the method 4 applied for ZP CSI-RS resource configuration can also be applied to a NZP CSI-RS resource configuration. By doing so, it may be able to perform aperiodic NZP CSI-RS transmission.

TABLE 14

Table 7.1.9-1: PDSCH RE Mapping and Quasi-Co-Location Indicator field in DCI format 2 D

| Value of 'PDSCH RE Mapping and Quasi-Co-Location Indicator' field | Description |
| --- | --- |

TABLE 14-continued

Table 7.1.9-1: PDSCH RE Mapping and Quasi-Co-Location Indicator field in DCI format 2 D

| | |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE
mapping and PDSCH antenna port quasi co-location
are configured via higher layer signaling for each parameter set:
crs-PortsCount.
crs-FreqShift.
mbsfn-SubframeConfigList.
csi-RS-ConfigZPId of a new ZP CSI-RS
Resource defined by the present invention
pdsch-Start.
qcl-CSI-RS-ConfigNZPId.

And, the method 4 can be configured to be limitedly applied to a UE operating in TM 10 only.

As a different example, when a UE receiving data in TM 10 is configured to perform EPDCCH monitoring, the UE receives a re-MappingQCL-ConfigId-r11 parameter according to an EPDCCH-PRB-Set from a base station via a upper layer signal for a proper EPDCCH RE mapping assumption of each (configured) EPDCCH-PRB-Set. In this case, the re-MappingQCL-ConfigId-r11 parameter configured/signaled according to the EPDCCH-PRB-Set may correspond to a PDSCH RE mapping assumption (and/or PDSCH antenna port Quansi Co-location assumption)-related parameter set configured according to a PQI state mentioned earlier in Table 12, i.e., corresponds to one of {crs-PortsCount-r11, crs-FreqShift-r11, mbsfn-SubframeConfigList-r11, csi-RS-ConfigZPId-r11, pdsch-Start-r11, and qcl-CSI-RS-ConfigNZPId-r11}.

In this case, while identically maintaining a re-MappingQCL-ConfigId-r11 parameter configuration/matching process according to a legacy EPDCCH-PRB-Set, the method 4 can notify a proper EPDCCH RE mapping assumption (and/or EPDCCH antenna port Quasi Co-location assumption) of an individual (configured) EPDCCH-PRB-Set in a flexible downlink resource set as well as a static downlink resource set.

Method 5

In case of applying the method 1 to the method 4, it may be able to configure at least one of a configuration #A to a configuration #C described in the following to be applied.

Configuration #A: In configuration/definitions (i.e., [Alt #1] and [Alt #2]) of a new CSI-IM resource configuration(s) of Table 5, maximum two CSI-IM resource(s) based on CSI-IM-ConfigId different from each other set to a CSI process and/or a CSI-IM resource(s) configured by maximum two {resourceConfig, subframeConfig} based on an identical CSI-IM-ConfigId should be configured not to appear at an identical subframe timing at the same time and should be configured not to be overlapped with each other.

For instance, if (two) CSI subframe set(s) are set to a CSI process of a UE (e.g., eIMTA UE) operating in TM 10 and the UE performs interference measurement related to a specific CSI subframe set using a CSI-IM resource(s) belonging to the specific CSI subframe set only, (unlike a legacy configuration) the configuration #A can prevent the UE from performing the interference measurement related to the specific CSI subframe set using 8 RE(s) at a random SF timing (e.g., a random SF timing on which a CSI-IM resource exists). In particular, if the configuration #A is applied, (similar to the legacy configuration) the UE can perform the interference measurement related to the specific CSI subframe set using 4 RE(s) at a random subframe timing (e.g., a random SF timing on which a CSI-IM resource exists).

And, according to the configuration #A, if a plurality of CSI-IM resource(s) appear at an identical subframe timing or a plurality of the CSI-IM resource(s) are overlapped with each other in a subframe timing, although a plurality of the CSI-IM resource(s) are overlapped with each other in a time resource domain, a plurality of the CSI-IM resource(s) may not be overlapped with each other in a frequency resource domain.

And, if the configuration #A is applied to [Alt #1], a UE may not expect different CSI-IM-ConfigId-based maximum two CSI-IM resource(s), which are appearing at an identical subframe timing or overlapped with each other at an identical subframe timing.

In addition, if the configuration #A is applied to [Alt #2], a UE may not expect CSI-IM resource(s), which are configured by maximum two {resourceConfig, subframeConfig} based on an identical CSI-IM-ConfigId, appearing at an identical subframe timing or overlapped with each other at an identical subframe timing.

Configuration #B: In configuration/definitions (i.e., [Alt #1] and [Alt #2]) of a new CSI-IM resource configuration(s) of Table 5, if maximum two CSI-IM resource(s) based on CSI-IM-ConfigId different from each other set to a CSI process and/or a CSI-IM resource(s) configured by maximum two {resourceConfig, subframeConfig} based on an identical CSI-IM-ConfigId appear at an identical subframe timing or are overlapped with each other at an identical subframe timing, i) a UE can be configured to determine it as a CSI-IM resource including a relatively low CSI-IM-ConfigId (i.e., useful in case of [Alt #1]) is valid only, ii) the UE can be configured to determine it as a CSI-IM resource including a relatively long interval (e.g., determined by subframeConfig) (i.e., useful in case of [Alt #1]/[Alt #2]) is valid only, iii) the UE can be configured to determine it as a specific CSI-IM resource defined or signaled in advance is valid only, iv) the UE can be configured to determine it as a CSI-IM resource(s), which is completely covered by a specific ZP CSI-RS resource designated by a PQI field (i.e., DCI format 2D) at the subframe timing, is valid only (e.g., if the specific ZP CSI-RS resource designated by the PQI field covers one CSI-IM resource only, it is determined as the CSI-IM resource is valid only. If the specific ZP CSI-RS resource designated by the PQI field covers two CSI-IM resources, it is determined as the two CSI-IM resources are valid), or v) it is able to configure (at least one or more) ZP CSI-RS resources capable of covering all of (maximum) two CSI-IM resources appearing or overlapped with each other at an identical subframe timing to be mandatorily configured (i.e., at the subframe timing on which (maximum) two CSI-IM resources are appearing at the same time or overlapped with each other, the ZP CSI-RS resource is designated by a PQI field).

The configuration #A and/or the configuration #B can be useful when ([Alt #1] or [Alt #2]-based) individual CSI-IM resources appearing at the same time or overlapped with each other at an identical subframe timing are covered by an independent (configured) ZP CSI-RS resource (i.e., refer to "A UE is not expected to receive a CSI-IM resource configuration that is not completely overlapping with one of the zero-power CSI-RS resource configurations defined in subclause 7.2.7" of Table 3) and when the individual (configured) ZP CSI-RS resource is incapable of covering both of (maximum) two CSI-IM resources appearing at the same time or overlapped with each other at an identical subframe timing.

In other word, this is because it is unable to assume that interference of an identical characteristic appears or is received on (maximum) two CSI-IM resource(s) appearing or overlapped with each other at identical subframe timing. In more particular, although a ZP CSI-RS resource assumed by a UE at a corresponding subframe timing corresponds to a specific ZP CSI-RS resource indicated by a PQI field (i.e., DCI format 2D), in this case, since the specific ZP CSI-RS resource indicated by the PQI field is unable to cover both of (maximum) two CSI-IM resource(s) appearing or overlapped with each other at the identical subframe timing, transmission of data (e.g., PDSCH) transmitted from a serving cell can be performed in at least one or more (i.e., a part or all) areas of a specific CSI-IM resource. Hence, it is unable to assume interference of an identical characteristic on the (maximum) two CSI-IM resource(s) appearing or overlapped with each other at the corresponding subframe timing. In particular, interference caused by data transmission of a corresponding TP instead of external interference experienced by a QCL characteristics-related (eIMTA) transmission point (TP) indicated by the PQI field occurs in the at least one or more (a part or all) areas of the specific CSI-IM resource.

Configuration #C: In the aforementioned method 1 to method 4, maximum two ZP CSI-RS resource(s) based on csi-RS-ConfigZPId different from each other and/or a ZP CSI-RS resource(s) configured by maximum two {resourceConfigList, subframeConfig} based on identical csi-RS-ConfigZPId should be configured not to be simultaneously appeared (overlapped with each other) at an identical subframe timing. As a different example, if the ZP CSI-RS resource(s) appear or are overlapped with each other at an identical subframe timing, a UE can be configured to determine it as a specific ZP CSI-RS resource is valid only based on a predetermined rule (e.g., a rule of determining it as a ZP CSI-RS resource including a relatively low csi-RS-ConfigZPId is valid only, a rule of determining it as a ZP CSI-RS resource including a relatively long interval is valid only or a rule of determining it as a predetermined (signaled in advance) ZP CSI-RS resource is valid only.

Method 6

The aforementioned method 1 to the method 5 of the present invention can be configured to be limitedly applied to one of configurations/definitions (i.e., [Alt #1], [Alt #2]) only of a new CSI-IM resource configuration(s) mentioned earlier in Table 5. Or, the aforementioned method 1 to the method 5 of the present invention can be configured to be limitedly applied to a specific TM (e.g., TM 10 or TM 1 to 9) only.

Moreover, the aforementioned embodiments of the present invention can be configured to be limitedly applied only when a dynamic change mode of a radio resource usage is configured. Moreover, the aforementioned embodiments of the present invention can also be applied when radio resource usage change information is configured to be transmitted via a predetermined system information transmission channel (e.g., SIB, PBCH (MIB) and paging) as well as a physical channel signal.

And, the aforementioned embodiments of the present invention can be configured to be limitedly used for at least one or more assumptions including i) EPDCCH RE mapping, ii) EPDCCH antenna port Quansi Co-location assumption, iii) PDSCH RE mapping assumption and iv) PDSCH antenna port Quansi Co-location assumption.

Moreover, the aforementioned embodiments/configurations/rules of the present invention can also be recognized as an embodiment to perform the present invention. It is apparent that each of the embodiments/configurations/rules can be considered as an independent embodiment. And, the embodiments of the present invention can be independently implemented or can be implemented in a combination form or an aggregated form of a part of the embodiments.

Moreover, the aforementioned embodiments of the present invention can be configured to be limitedly applied only i) when the predetermined number of channel state estimation processes is configured and/or ii) when a restricted CSI measurement (or resource-specific CSI measurement) is configured and/or iii) when a type (e.g., periodic channel state information report, aperiodic channel state information report) of a specific channel state information report is configured and/or iv) when a specific transmission mode (TM) (e.g., TM 10 or TM 1 to 9) is configured and/or v) when a specific uplink-downlink configuration is configured.

Figure 11:
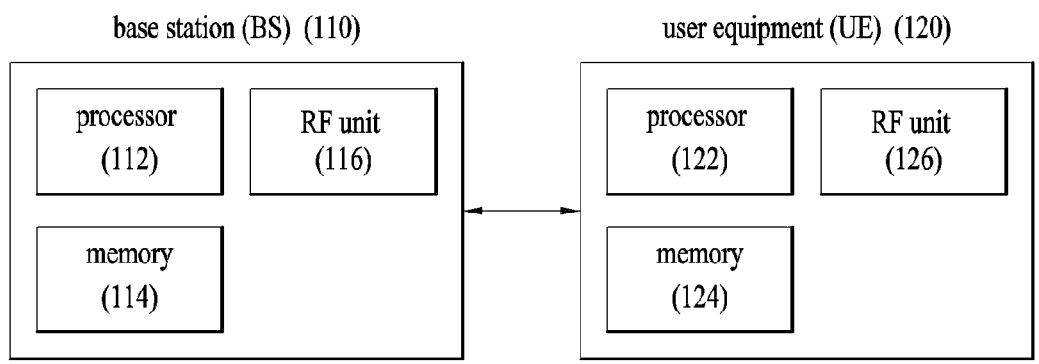
FIG. 11 is a diagram for a base station (BS) and a user equipment (UE) applicable to one embodiment of the present invention.

FIG. 11 is a diagram for a base station (BS) and a user equipment (UE) applicable to one embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 11, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of configuring an interference measurement resource in a wireless communication system and an apparatus therefor are described centering on examples applied to 3GPP LTE system, it may be applicable to various kinds of wireless communication systems as well as to the 3GPP LTE system.

What is claimed is:

1. A method of transmitting a channel state information-reference signal (CSI-RS) configuration by a base station in a wireless communication system, the method comprising:
    transmitting the CSI-RS configuration to a user equipment configured in transmission mode 1 through transmission mode 9, the CSI-RS configuration containing up to two zero power CSI-RS (ZP-CSI-RS) configurations; and
    transmitting a physical downlink shared channel (PDSCH) based on the up to two ZP-CSI-RS configurations to the user equipment,
    wherein, when two CSI subframe sets are configured for a serving cell, the CSI-RS configuration contains a first ZP-CSI-RS configuration or contains a first ZP-CSI-RS configuration and a second ZP-CSI-RS configuration,
    wherein, when two CSI subframe sets are not configured for a serving cell, the CSI-RS configuration contains a first ZP-CSI-RS configuration, and
    wherein the two CSI subframe sets correspond to restricted CSI measurement subframe sets.

2. The method of claim 1, wherein a zeroTxPowerResourceConfigList parameter and a zeroTxPowerSubframeConfig parameter are independently configured for the two ZP-CSI-RS configurations, respectively.

3. A method of receiving a channel state information-reference signal (CSI-RS) configuration by a user equipment in a wireless communication system, the method comprising:
    receiving the CSI-RS configuration from a base station, the CSI-RS configuration containing up to two zero power CSI-RS (ZP-CSI-RS) configurations; and
    receiving a physical downlink shared channel (PDSCH) based on the up to two ZP-CSI-RS configurations from the base station,
    wherein the user equipment is configured in transmission mode 1 through transmission mode 9,
    wherein, when two CSI subframe sets are configured for a serving cell, the CSI-RS configuration contains a first ZP-CSI-RS configuration or contains a first ZP-CSI-RS configuration and a second ZP-CSI-RS configuration,
    wherein, when two CSI subframe sets are not configured for a serving cell, the CSI-RS configuration contains a first ZP-CSI-RS configuration, and
    wherein the two CSI subframe sets correspond to restricted CSI measurement subframe sets.

4. The method of claim 3, wherein a zeroTxPowerResourceConfigList parameter and a zeroTxPowerSubframeConfig parameter are independently configured for the two ZP-CSI-RS configurations, respectively.

5. A base station transmitting a channel state information-reference signal (CSI-RS) configuration in a wireless communication system, the base station comprising:
    a radio frequency (RF) unit; and
    a processor configured to:
        transmit the CSI-RS configuration to a user equipment configured in transmission mode 1 through transmission mode 9, the CSI-RS configuration containing up to two zero power CSI-RS (ZP-CSI-RS) configurations, and
        transmit a physical downlink shared channel (PDSCH) based on the up to two ZP-CSI-RS configurations to the user equipment,
    wherein, when two CSI subframe sets are configured for a serving cell, the CSI-RS configuration contains a first ZP-CSI-RS configuration or contains a first ZP-CSI-RS configuration and a second ZP-CSI-RS configuration,
    wherein, when two CSI subframe sets are not configured for a serving cell, the CSI-RS configuration contains a first ZP-CSI-RS configuration, and
    wherein the two CSI subframe sets correspond to restricted CSI measurement subframe sets.

6. A user equipment receiving a channel state information-reference signal (CSI-RS) configuration in a wireless communication system, the user equipment comprising:
    a radio frequency (RF) unit; and
    a processor configured to:
        receive the CSI-RS configuration from a base station, the CSI-RS configuration containing up to two zero power CSI-RS (ZP-CSI-RS) configurations, and
        receive a physical downlink shared channel (PDSCH) based on the up to two ZP-CSI-RS configurations from the base station,
    wherein the user equipment is configured in transmission mode 1 through transmission mode 9,
    wherein, when two CSI subframe sets are configured for a serving cell, the CSI-RS configuration contains a first ZP-CSI-RS configuration or contains a first ZP-CSI-RS configuration and a second ZP-CSI-RS configuration, wherein, when two CSI subframe sets are not configured for a serving cell, the CSI-RS configuration contains a first ZP-CSI-RS configuration, and wherein the two CSI subframe sets correspond to restricted CSI measurement subframe sets.

* * * * *